US010999804B2

(12) United States Patent
Tanaka et al.

(10) Patent No.: US 10,999,804 B2
(45) Date of Patent: *May 4, 2021

(54) INFORMATION PROCESSING DEVICE, COMMUNICATION SYSTEM, INFORMATION PROCESSING METHOD, AND PROGRAM

(71) Applicant: Sony Corporation, Tokyo (JP)

(72) Inventors: Yusuke Tanaka, Tokyo (JP); Shigeru Sugaya, Kanagawa (JP); Yuichi Morioka, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/703,904

(22) Filed: Dec. 5, 2019

(65) Prior Publication Data
US 2020/0112923 A1 Apr. 9, 2020

Related U.S. Application Data

(63) Continuation of application No. 16/076,572, filed as application No. PCT/JP2016/089013 on Dec. 28, 2016, now Pat. No. 10,531,400.

(30) Foreign Application Priority Data
Mar. 2, 2016 (JP) .................................. 2016-040306

(51) Int. Cl.
*H04W 52/26* (2009.01)
*H04W 52/28* (2009.01)
(Continued)

(52) U.S. Cl.
CPC ........... *H04W 52/26* (2013.01); *H04W 52/18* (2013.01); *H04W 52/283* (2013.01);
(Continued)

(58) Field of Classification Search
CPC ... H04W 52/18; H04W 52/26; H04W 52/283; H04W 52/343; H04W 52/383;
(Continued)

(56) References Cited

U.S. PATENT DOCUMENTS 7,626,968 B2 12/2009 Adachi et al.
10,531,400 B2 * 1/2020 Tanaka ................ H04W 52/283
(Continued)

FOREIGN PATENT DOCUMENTS

EP 1386419 A2 2/2004
EP 2863699 A1 4/2015
(Continued)

OTHER PUBLICATIONS

International Search Report dated Mar. 28, 2017 in PCT/JP2016/089013 citing references AA-AD and AO-AT therein, 2 pages.
(Continued)

*Primary Examiner* — Tan H Trinh
(74) *Attorney, Agent, or Firm* — Xsensus, LLP

(57) ABSTRACT

An information processing apparatus includes a control part. The control part performs control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of surrounding environment information regarding an environment surrounding the information processing apparatus transmitting the frame. Transmission of the frame causes the transmission inhibition time to be set over an appropriate range of information processing apparatuses. Efficiency of utilization of communication resources is improved by suitably setting a transmission inhibition time.

10 Claims, 17 Drawing Sheets

(51) Int. Cl.
*H04W 52/34* (2009.01)
*H04W 52/38* (2009.01)
*H04W 52/46* (2009.01)
*H04W 52/50* (2009.01)
*H04W 84/12* (2009.01)
*H04W 74/04* (2009.01)
*H04W 52/18* (2009.01)

(52) U.S. Cl.
CPC ....... *H04W 52/343* (2013.01); *H04W 52/383* (2013.01); *H04W 52/46* (2013.01); *H04W 52/50* (2013.01); *H04W 74/04* (2013.01); *H04W 84/12* (2013.01)

(58) Field of Classification Search
CPC ..... H04W 52/46; H04W 52/50; H04W 74/04; H04W 84/12
USPC .......... 455/69, 522, 450; 370/310, 204, 329, 370/338, 349, 350
See application file for complete search history.

(56) References Cited

U.S. PATENT DOCUMENTS

| | | | |
|---|---|---|---|
| 2001/0019961 A1 | 9/2001 | Nakahara et al. | |
| 2002/0172186 A1 | 11/2002 | Larsson | |
| 2005/0068934 A1 | 3/2005 | Sakoda | |
| 2005/0105504 A1* | 5/2005 | Sakoda | H04L 1/0072 370/349 |
| 2006/0084461 A1 | 4/2006 | Sekiya et al. | |
| 2007/0019592 A1* | 1/2007 | Otsuki | H04W 74/0816 370/338 |
| 2007/0115971 A1 | 5/2007 | Jang et al. | |
| 2010/0039969 A1 | 2/2010 | Sukenari et al. | |
| 2011/0059762 A1 | 3/2011 | Jones et al. | |
| 2012/0069828 A1* | 3/2012 | Taki | H04W 88/16 370/338 |
| 2013/0259016 A1* | 10/2013 | Xhafa | H04W 4/80 370/338 |
| 2014/0038625 A1 | 2/2014 | Palanivelu et al. | |
| 2014/0171145 A1* | 6/2014 | Che | H04W 52/283 455/522 |
| 2014/0286203 A1 | 9/2014 | Jindal et al. | |
| 2015/0181620 A1 | 6/2015 | Seok | |
| 2015/0188675 A1 | 7/2015 | Abeysekera et al. | |
| 2017/0118725 A1 | 4/2017 | Chu et al. | |

FOREIGN PATENT DOCUMENTS

| | | |
|---|---|---|
| JP | 2004-533158 A | 10/2004 |
| JP | 2015-523802 A | 8/2015 |
| JP | 2016040306 A | 3/2016 |
| WO | 2004/071021 A1 | 8/2004 |
| WO | 2008/059678 A1 | 5/2008 |
| WO | 2009/089241 A2 | 7/2009 |
| WO | 2012/112807 A1 | 8/2012 |
| WO | 2015/031045 A1 | 3/2015 |
| WO | 2015/037879 A1 | 3/2015 |

OTHER PUBLICATIONS

Extended European Search Report dated Nov. 13, 2018 in European Application No. 16892753.1-1219.

* cited by examiner

F I G . 1 4
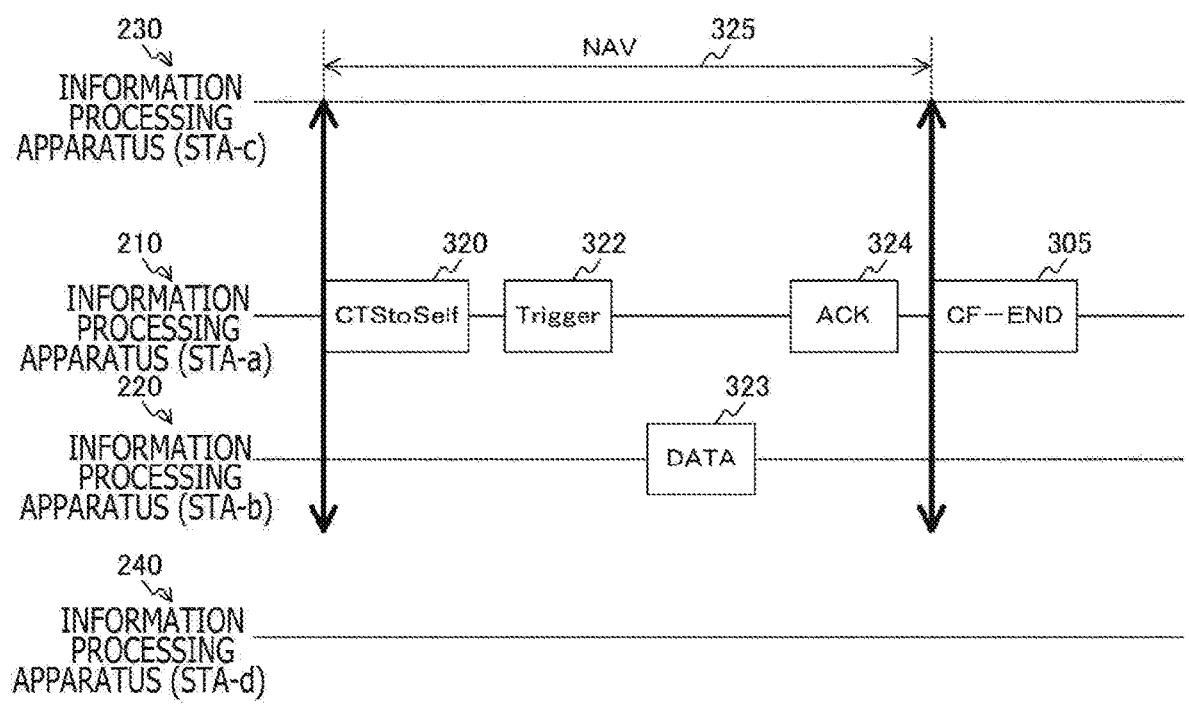

INFORMATION PROCESSING DEVICE, COMMUNICATION SYSTEM, INFORMATION PROCESSING METHOD, AND PROGRAM

CROSS-REFERENCE TO RELATED APPLICATIONS

The present application is a continuation of U.S. application Ser. No. 16/076,572, filed Aug. 8, 2018, which is based on PCT filing PCT/JP2016/089013, filed Dec. 28, 2016, which claims priority to JP 2016-040306, filed Mar. 2, 2016, the entire contents of each are incorporated herein by reference.

TECHNICAL FIELD

The present technology relates to an information processing apparatus, a communication system, an information processing method, and a program. More particularly, the technology relates to an information processing apparatus, a communication system, and an information processing method for exchanging information by wireless communication, as well as a program for causing a computer to execute the information processing method.

BACKGROUND ART

In the past, multiple information processing apparatuses exchanging information (frames) therebetween by wireless communication have used a system to set a transmission inhibition time for averting collisions between their transmissions. For example, a data source station transmits a frame (RTS frame) for requesting the transmission of data to another station and for requesting other stations to set a transmission inhibition time. Thereafter, the station as the destination of the data transmits a frame (CTS frame) to enable the data transmission. What has been studied in implementing this system is how to add to the CTS frame the information regarding the power for transmitting the data. There have been proposed systems that enable data to be transmitted with the power determined on the basis of the information about the data transmitting power, the information being added to the frame by the data source station (e.g., see PTL 1).

CITATION LIST

Patent Literature

[PTL 1]
JP 2004-533158T

SUMMARY

Technical Problem

A problem with the existing technology outlined above is that the technology lets the RTS frame and other information be transmitted with predetermined power and does not provide suitable control over the transmitting power. Presumably, the existing technology may leave the RTS frame transmitted with excess transmitting power. Thus there is a possibility that the transmission inhibition time may be set over a wider range of stations than necessary. With the existing technology above, the transmission inhibition time is not set appropriately, which leads to a drop in the efficiency of utilization of communication resources.

The present technology has been made in view of the above circumstances. An object of the technology is to improve the efficiency of utilization of communication resources by suitably setting the transmission inhibition time.

Solution to Problem

In solving the above-mentioned problem and according to a first aspect of the present technology, there are provided an information processing apparatus, an information processing method for use with the apparatus, and a program for causing a computer to execute the method, the information processing apparatus including a control part configured to perform control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of surrounding environment information regarding an environment surrounding the information processing apparatus transmitting the frame. This provides an advantageous effect of determining, on the basis of the surrounding environment information, the power for transmitting the frame for requesting the transmission of the data to the information processing apparatus as the destination and for requesting information processing apparatuses other than the destination information processing apparatus to set the transmission inhibition time.

Also according to the first aspect of the present technology, the control part may perform control to transmit a communication end frame for notifying the end of communication of the data and for requesting the transmission inhibition time to be canceled, the communication end frame being transmitted with the transmitting power determined on the basis of the surrounding environment information. This provides an advantageous effect of determining the power for transmitting the communication end frame on the basis of the surrounding environment information.

Also according to the first aspect of the present technology, the control part may perform control to transmit the communication end frame using the transmitting power determined on the basis of transmitting power information transmitted from the information processing apparatus as the destination and of the surrounding environment information. This provides an advantageous effect of determining the transmitting power for the communication end frame on the basis of the transmitting power information transmitted from the information processing apparatus as the destination and of the surrounding environment information.

According to a second aspect of the present technology, there are provided an information processing apparatus, an information processing method for use with the apparatus, and a program for causing a computer to execute the method, the information processing apparatus including a control part configured to perform control to transmit a frame for enabling an information processing apparatus as a source of data to transmit the data and for requesting information processing apparatuses other than the information processing apparatus as the source to set a transmission inhibition time, the frame being transmitted with transmitting power determined on the basis of surrounding environment information regarding an environment surrounding the information processing apparatus transmitting the frame.

This provides an advantageous effect of determining, on the basis of the surrounding environment information, the power for transmitting the frame for enabling the information processing apparatus as the source of data to transmit the data and for requesting information processing apparatuses other than the information processing apparatus as the source to set the transmission inhibition time.

Also according to the second aspect of the present technology, the control part may perform control to transmit the frame in which information regarding the transmitting power is stored. This provides an advantageous effect of transmitting the frame having the transmitting power information stored therein.

Also according to the second aspect of the present technology, the control part may perform control to transmit a communication end frame for notifying the end of communication of the data and for requesting the transmission inhibition time to be canceled, the communication end frame being transmitted with the transmitting power determined on the basis of the surrounding environment information. This provides an advantageous effect of determining the transmitting power for the communication end frame on the basis of the surrounding environment information.

According to a third aspect of the present technology, there are provided an information processing apparatus, an information processing method for use with the apparatus, and a program for causing a computer to execute the method, the information processing apparatus including a control part configured to perform control to transmit a frame for enabling the own information processing apparatus to transmit data and for requesting other information processing apparatuses to set a transmission inhibition time, the frame being transmitted with transmitting power determined on the basis of surrounding environment information regarding an environment surrounding the own information processing apparatus. This provides an advantageous effect of determining, on the basis of the surrounding environment information, the power for transmitting the frame for enabling the own information processing apparatus to transmit the data and for requesting other information processing apparatuses to set the transmission inhibition time.

Also according to the third aspect of the present technology, the control part may perform control to transmit a communication end frame for notifying the end of communication of the data and for requesting the transmission inhibition time to be canceled, the communication end frame being transmitted with the transmitting power determined on the basis of the surrounding environment information. This provides an advantageous effect of determining the power for transmitting the communication end frame on the basis of the surrounding environment information.

Also according to the third aspect of the present technology, the control part may, in the case of transmitting data, perform control to transmit the frame using the transmitting power determined on the basis of the surrounding environment information and of destination surrounding environment information regarding an environment surrounding the information processing apparatus as the destination of the data. This provides an advantageous effect of determining the transmitting power on the basis of the destination surrounding environment information and the surrounding environment information in the case of transmitting the data.

Also according to the third aspect of the present technology, the control part may perform control to transmit a communication end frame for notifying the end of communication of the data and for requesting the transmission inhibition time to be canceled, the communication end frame being transmitted with the transmitting power determined on the basis of the destination surrounding environment information and the surrounding environment information. This provides an advantageous effect of determining the power for transmitting the communication end frame on the basis of the destination surrounding environment information and the surrounding environment information.

According to a fourth aspect of the present technology, there are provided a communication system, an information processing method for use with the system, and a program for causing a computer to execute the method, the communication system including: a first information processing apparatus including a first control part configured to perform control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of first surrounding environment information regarding an environment surrounding the first information processing apparatus; and a second information processing apparatus including a second control part configured to perform control to transmit a frame for enabling the information processing apparatus as a source of the data to transmit the data and for requesting information processing apparatuses other than the information processing apparatus as the source to set a transmission inhibition time, the frame being transmitted with transmitting power determined on the basis of second surrounding environment information regarding an environment surrounding the second information processing apparatus. This provides an advantageous effect of determining, on the basis of the surrounding environment information, the power for transmitting the frame for requesting the transmission of data to the information processing apparatus as the destination of the data and for requesting information processing apparatuses other than the information processing apparatus as the destination to set the transmission inhibition time. Also provided is an advantageous effect of determining, on the basis of the surrounding environment information, the power for transmitting the frame for enabling the information processing apparatus as the source of data to transmit the data and for requesting information processing apparatuses other than the information processing apparatus as the source to set the transmission inhibition time.

Advantageous Effects of Invention

Thus the present technology provides the advantageous effect of improving the efficiency of utilization of communication resources by suitably setting the transmission inhibition time. There may be other advantageous effects derived from but not covered by this description.

BRIEF DESCRIPTION OF DRAWINGS

FIG. 14 is a schematic diagram depicting another example of data communication performed by the fourth embodiment of the present technology.

DESCRIPTION OF EMBODIMENTS

The preferred modes for implementing the present technology (referred to as the embodiments) are described below. The description is given under the following headings:
1. First embodiment (an example in which the information processing apparatus as the source of data transmits a CF-END frame)
2. Second embodiment (an example in which the information processing apparatus as the source of data and the information processing apparatus as the destination of data transmit a CF-END frame each)
3. Third embodiment (an example in which multiplex data communication is performed)
4. Fourth embodiment (an example in which a CTS-To-Self frame is transmitted)
5. Application examples

1. FIRST EMBODIMENT

[Typical Configuration of the Communication System]

Figure 1:
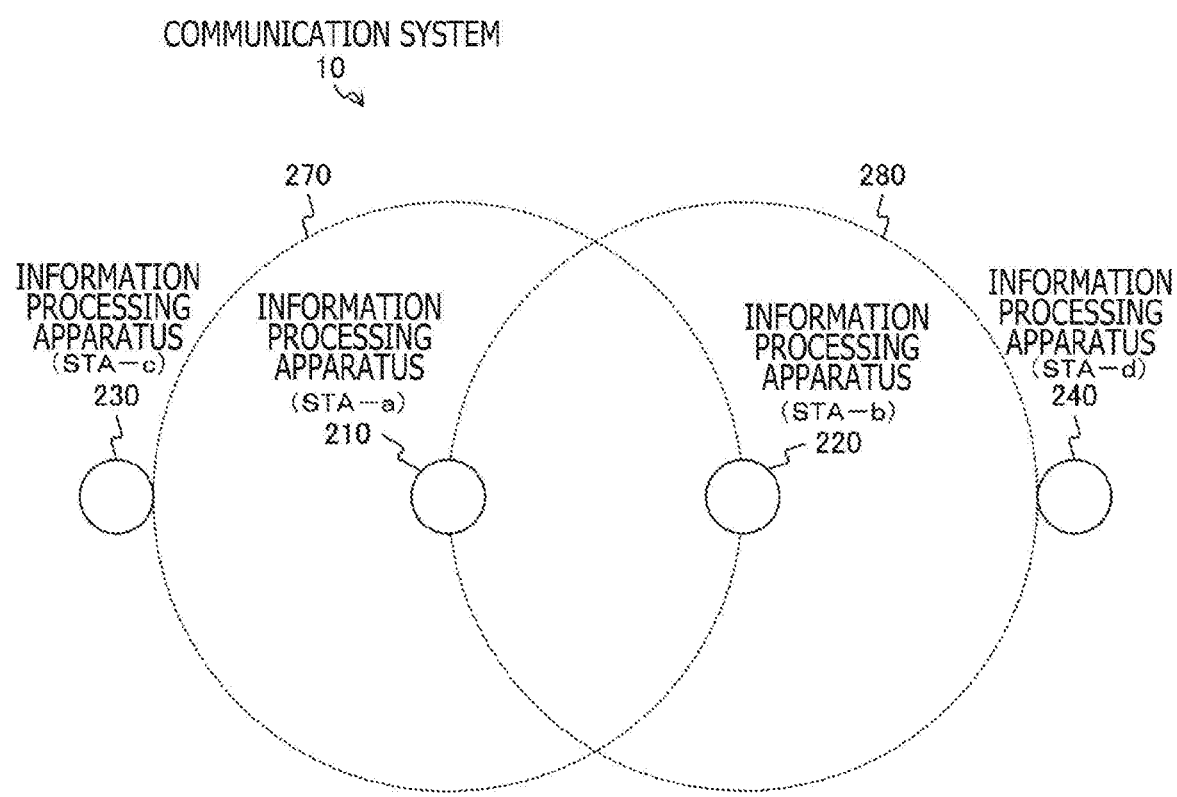
FIG. 1 is a schematic diagram depicting a typical configuration of a communication system 10 embodying the present technology.

FIG. 1 is a schematic diagram depicting a typical configuration of a communication system 10 embodying the present technology. The communication system 10 in FIG. 1 constitutes a wireless network including an information processing apparatus (STA-a) 210, an information processing apparatus (STA-b) 220, an information processing apparatus (STA-c) 230, and an information processing apparatus (STA-d) 240. In the example of FIG. 1, connection is established between the information processing apparatus (STA-a) 210 and the information processing apparatus (STA-b) 220. Incidentally, a broken-line circle centering on the information processing apparatus (STA-a) 210 denotes a radio wave reach range 270 of this apparatus. Another broken-line circle centering on the information processing apparatus (STA-b) 220 represents a radio wave reach range 280 of this apparatus.

For example, the information processing apparatus (STA-a) 210, information processing apparatus (STA-b) 220, information processing apparatus (STA-c) 230, and information processing apparatus (STA-d) 240 may each be provided as a stationary or portable information processing apparatus having a wireless communication function. Here, the stationary information processing apparatus is, for example, an access point or a base station on a wireless LAN (local area network). The portable information processing apparatus is, for example, an information processing apparatus such as a smartphone, a mobile phone, or a tablet terminal.

Also, it is assumed that the information processing apparatus (STA-a) 210, information processing apparatus (STA-b) 220, information processing apparatus (STA-c) 230, and information processing apparatus (STA-d) 240 are each provided with a communication function complying with the wireless LAN standards of the IEEE (Institute of Electrical and Electronic Engineers) 802.11. For example, each of these apparatuses is assumed to have the communication function complying with the wireless LAN standard of the IEEE 802.11ax. For the wireless LAN, Wi-Fi (Wireless Fidelity), Wi-Fi Direct, or Wi-Fi CERTIFIED Miracast specifications (technical specification name: Wi-Fi Display) may be adopted. Alternatively, wireless communication may be performed using some other suitable communication method. Incidentally, the information processing apparatus (STA-a) 210 is an example of the first information processing apparatus stated in the claims. The information processing apparatus (STA-b) 220 is an example of the second information processing apparatus stated in the claims.

For example, the communication system 10 may be constituted as a network (e.g., mesh network or ad-hoc network) on which multiple apparatuses perform one-on-one wireless communication therebetween and are thereby interconnected. For example, the IEEE 802.11s mesh network may be applied to the communication system 10.

Incidentally, what follows is a description of this embodiment in which the performance of a data source device (transmitting device) and that of a data destination device (receiving device) are covered separately. Alternatively, however, that each device may incorporate both capabilities or only one of the two capabilities.

Also, the system configuration to be addressed by this embodiment is not limited to what is described hereunder. For example, although FIG. 1 depicts a communication system configured with four information processing apparatuses, the number of the configured information processing apparatuses is not limited to four.

[Typical Functional Configuration of the Information Processing Apparatus]

Figure 2:
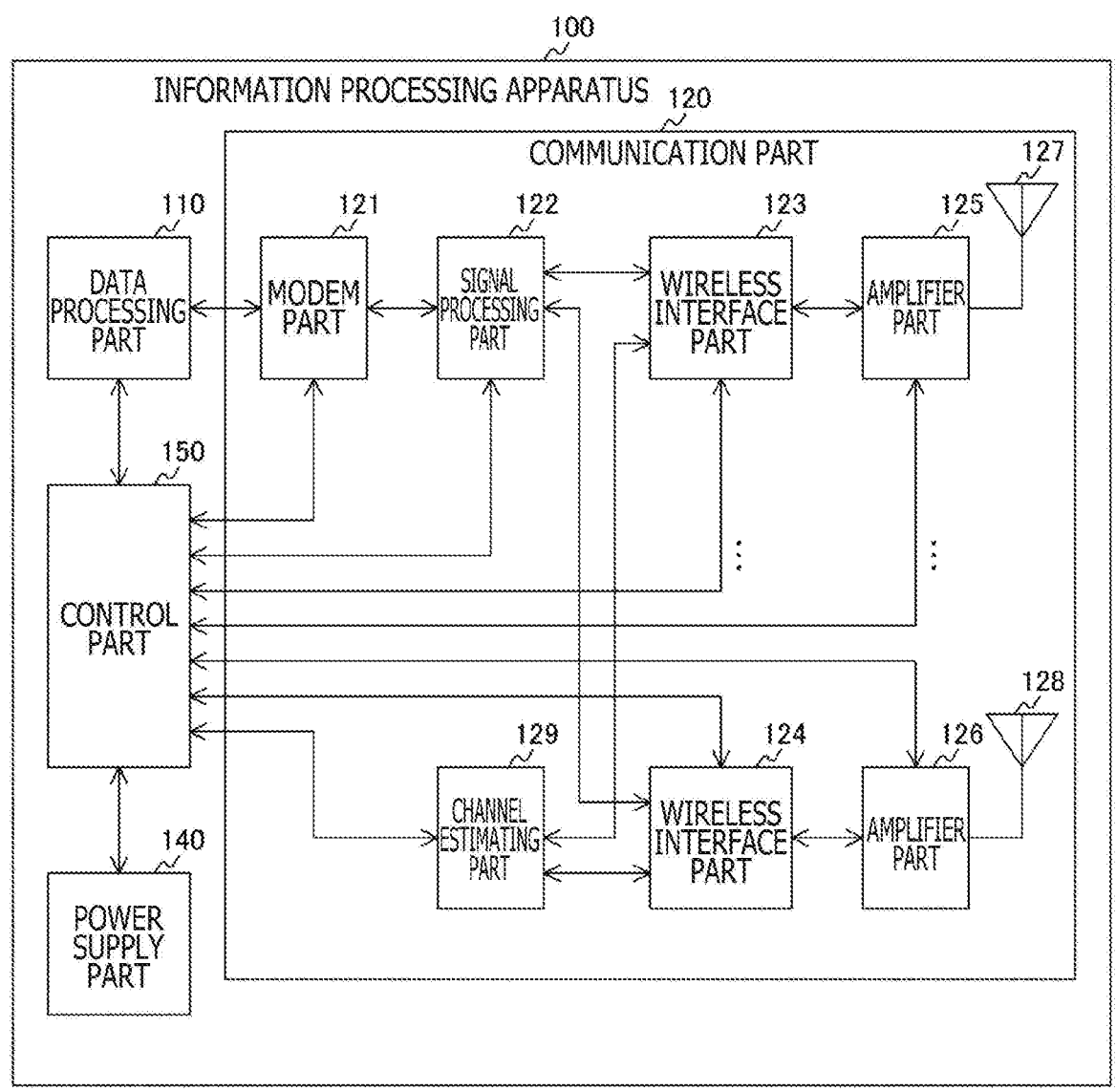
FIG. 2 is a schematic diagram depicting a typical functional configuration of an information processing apparatus 100 embodying the present technology.

FIG. 2 is a schematic diagram depicting a typical functional configuration of the information processing apparatus 100 embodying the present technology. The information processing apparatus 100 represents a typical functional configuration of the information processing apparatus (STA-a) 210, information processing apparatus (STA-b) 220, information processing apparatus (STA-c) 230, and information processing apparatus (STA-d) 240 depicted in FIG. 1.

The information processing apparatus 100 includes a data processing part 110, a communication part 120, a power supply part 140, and a control part 150. The communication part 120 includes a modem part 121, a signal processing part 122, wireless interface parts 123 and 124, amplifier parts 125 and 126, antennas 127 and 128, and a channel estimating part 129. It is assumed that the communication part 120 is capable of performing communication using OFDMA (Orthogonal Frequency-Division Multiple Access) and MU-MIMO (Multi User Multiple Input Multiple Output) techniques.

The data processing part 110 processes various data under control of the control part 150. At the time of transmission, with data input from a higher layer, for example, the data processing part 110 generates from the input data a packet for wireless transmission. The data processing part 110 then performs such processes as addition of a header and addition of an error-detecting code for media access control (MAC), and provides the processed data to the modem part 121. At the time of reception, with data input from the modem part 121, for example, the data processing part 110 carries out such processes as MAC header analysis, packet error detection and reordering, and provides the processed data to a higher protocol layer of the own apparatus. Also, the data processing part 110 notifies the control part 150 of the results of the processing such as the result of header analysis and the result of packet error detection.

The modem part 121 performs modulation and demodulation processes under control of the control part 150. At the time of transmission, for example, the modem part 121 carries out encoding, interleave, and modulation on the data input from the data processing part 110 in accordance with the coding and modulation methods set by the control part 150. The modem part 121 then generates a data symbol stream and provides it to the signal processing part 122. At the time of reception, for example, the modem part 121 processes the data input from the signal processing part 122 in a manner reverse to that of the transmission time, and provides the data to the data processing part 110 or to the control part 150.

The signal processing part 122 performs diverse signal processing (e.g., spatial signal processing) under control of the control part 150. At the time of transmission, for example, the signal processing part 122 carries out signal processing (spatial signal processing) subject to spatial separation with regard to the input from the modem part 121 as needed, and provides at least one transmit symbol stream acquired from the processing to the wireless interface parts 123 and 124. At the time of reception, for example, the signal processing part 122 performs signal processing on the received symbol stream input from the wireless interface parts 123 and 124, carries out spatial separation on the stream as needed, and provides the processed data to the modem part 121.

The wireless interface parts 123 and 124 are each an interface for transmitting and receiving diverse information to and from other information processing apparatuses connected by wireless communication. At the time of transmission, for example, the wireless interface parts 123 and 124 convert the data input from the signal processing part 122 into an analog signal and carry out filtering and up-conversion to carrier frequency. The wireless interface parts 123 and 124 then output the analog signal from the antennas 127 and 128 via the amplifier parts 125 and 126. At the time of reception, for example, the wireless interface parts 123 and 124 process the data input from the antenna 127 and 128 or from the amplifier parts 125 and 126 in a manner reverse to that of the transmission time, and provide the processed data to the signal processing part 122 and to the channel estimating part 129.

The amplifier parts 125 and 126 constitute amplifiers that amplify the analog signal up to a predetermined power level. At the time of transmission, for example, the amplifier parts 125 and 126 amplify, up to the predetermined power level, the analog signal input from the wireless interface parts 123 and 124 and output the amplified signal from the antennas 127 and 128. At the time of reception, for example, the amplifier parts 125 and 126 amplify, up to the predetermined power level, the signal input from the antenna 127 and 128 and output the amplified signal to the wireless interface parts 123 and 124.

Incidentally, FIG. 2 depicts the amplifier parts 125 and 126 as well as the wireless interface parts 123 and 124 as a separately configured part each. Alternatively, the amplifier parts 125 and 126 may be configured to have at least either their transmitting function or their receiving function included in the wireless interface parts 123 and 124.

Also, in the example of FIG. 2, the wireless interface part 123, amplifier part 125, and antenna 127 are configured as one combination and the wireless interface part 124, amplifier part 126, and antenna 128 are configured as another combination, there being multiple such combinations in the configuration. Alternatively, the wireless interface part, amplifier part, and antenna may be configured as the components that form only one combination.

Given an input signal from the wireless interface parts 123 and 124, the channel estimating part 129 calculates complex channel gain information regarding a propagation path from a preamble portion and a training signal portion of the input signal. The calculated complex channel gain information is forwarded via the control part 150 to the modem part 121 for use in modulation and demodulation processing and to the signal processing part 122 for spatial processing.

Under control of the control part 150, the power supply part 140 supplies power to the components of the information processing apparatus 100. In the case where the information processing apparatus 100 is a stationary device, for example, the power supply part 140 is configured with a fixed power supply. In the case where the information processing apparatus 100 is a portable device (e.g., mobile device), for example, the power supply part 140 is configured with a battery power supply.

The control part 150 controls the transmitting and receiving operations of the components in the information processing apparatus 100 on the basis of control programs. For example, the control part 150 causes information to be exchanged between the components of the information processing apparatus 100. In another example, the control part 150 sets parameters for the modem part 121 and signal processing part 122 and schedules packets for the data processing part 110. In a further example, the control part 150 sets parameters and controls transmitting power for the wireless interface parts 123 and 124 and for the amplifier parts 125 and 126. In this embodiment of the present technology, in particular, the control part 150 determines the transmitting power for an RTS (request-to-send) frame, a CTS (clear-to-send) frame, and a CF-END frame, and performs control to transmit these frames using the transmitting power thus determined.

Here, the RTS frame is a frame used to request the transmission of data to the information processing apparatus as the destination of data and to request the other apparatuses to set a transmission inhibition time. The CTS frame is a frame used to enable the information processing apparatus as the source of data to transmit the data and to request the other information processing apparatuses to set a transmission inhibition time. Transmitting these frames sets an NAV (network allocation vector) on the information processing apparatuses not involved in the data communication. Further, the CF-END frame is a communication end frame used to give notification that the data-related communication is terminated and to request the cancellation of the network allocation vector having been set.

Also, the control part 150 performs control to communicate using OFDMA and MU-MIMO techniques, for example. Furthermore, the control part 150 determines how channel resources are to be allocated, gives notification of the allocations, and performs control to communicate in accordance with the allocations.

[Typical Structure of the Frame]

Figure 3:
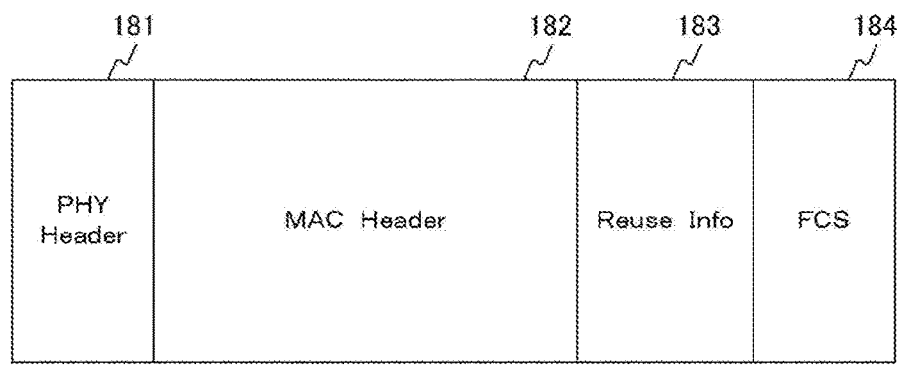
FIG. 3 is a schematic diagram depicting a typical structure of a frame targeted for transmission and reception performed by the information processing apparatus 100 embodying the present technology.

FIG. 3 is a schematic diagram depicting a typical structure of a frame targeted for transmission and reception performed by the information processing apparatus 100 embodying the present technology. The frame in this diagram is constituted by a PHY Header portion 181, a MAC Header portion 182, a Reuse Info portion 183, and an FCS portion 184.

A BSS (Basic Service Set) Color and a Length, for example, are stored in the PHY Header 181.

The BSS Color is information introduced by the IEEE 802.11ah. For example, an AP (access point) may declare a unique BSS Color for each BSS, set the BSS Color in the PHY Header 181 of the frame, and transmit the frame. A device having received the frame determines whether or not the received frame is destined for the own BSS (i.e., whether or not there is a possibility that the frame is destined for the own apparatus). In this manner, it is determined, at the initial portion of the frame, whether or not there is a possibility that the frame is destined for the own apparatus. Thus in the case where the received frame is destined for a third party (i.e., not destined for the own apparatus), the subsequent processing is omitted. This reduces the power consumption related to data reception.

The Length is the information for identifying the length of the frame.

A destination address (Rx Address), a frame type, and Duration, for example, are stored in the MAC Header 182. The frame type is the information for identifying the attribute of the frame (frame kind). The Duration represents information regarding the duration for setting the NAV.

Tx/Rx Flag, Data Length, Data MCS (Modulation and Coding Scheme), Priority, and transmitting power information, for example, are stored in the Reuse Info 183. The Reuse Info 183 may be included in the PHY Header 181 or in the MAC Header 182.

The Tx/Rx Flag is a data transmission/reception flag constituting the information for identifying the data transmitting or receiving side. The Data Length is the information for identifying the length of the data targeted for transmission (i.e., data length on the time axis, data size). The Data MCS is the information for identifying the modulation method for the data to be transmitted. The Priority is the information for identifying the degree of importance of the data to be transmitted.

The transmitting power information is the information regarding the power for transmitting this frame, i.e., the information for identifying the frame transmitting power.

An error-detecting code is stored in the FCS 184.

The above-described items of information are only examples. Alternatively, other items of information may be stored in the frame. For example, the distance between the data transmitting device and the data receiving device may be stored in the frame. As another alternative, some of these items of information may be omitted when storing in the frame.

[Data Communication]

Figure 4:
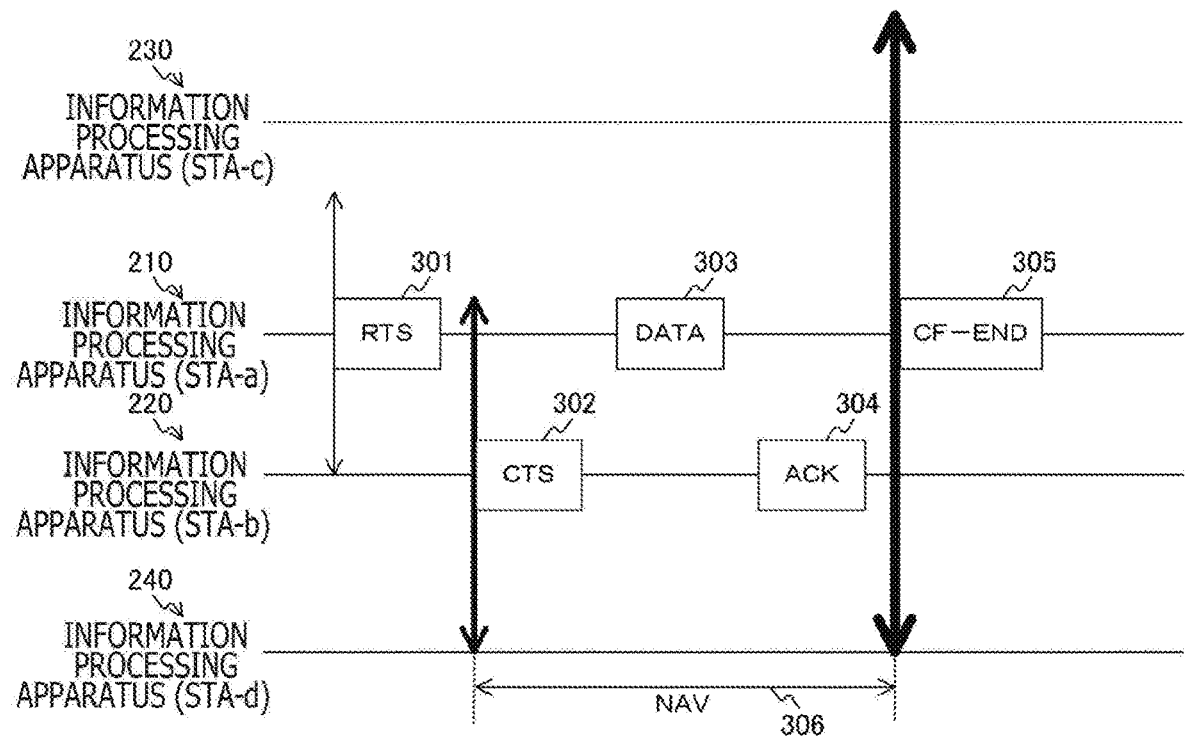
FIG. 4 is a schematic diagram depicting an example of data communication performed by a first embodiment of the present technology.

FIG. 4 is a schematic diagram depicting an example of data communication performed by the first embodiment of the present technology. This diagram illustrates a typical case in which the information processing apparatus (STA-a) 210 transmits data to the information processing apparatus (STA-b) 220. The horizontal axis of this diagram represents the time axis, and rectangles in the diagram represent frames.

First, the information processing apparatus (STA-a) 210 transmits an RTS frame 301. At this time, the transmitting power is determined on the basis of surrounding environment information regarding the information processing apparatus (STA-a) 210 preparatory to transmission. The transmitting power in this case may be determined to be large enough to carry the data unfailingly to the data destination information processing apparatus (STA-b) 220. At this point, there is no need for the RTS frame 301 to reach the information processing apparatus (STA-c) 230. In FIG. 4, arrows in the vertical direction denote the status of the transmitting power. The thickness of each arrow represents a relative magnitude of the transmitting power.

As is evident from FIG. 4, the RTS frame 301 reaches only the information processing apparatus (STA-b) 220 and does not get to the information processing apparatus (STA-c) 230 or to the information processing apparatus (STA-d) 240. For this reason, the NAV is not set on the information processing apparatus (STA-c) 230 or on the information processing apparatus (STA-d) 240. This allows the information processing apparatus (STA-c) 230 to communicate wirelessly, which permits effective use of the communication resources. Since the information processing apparatus (STA-a) 210 is on the data-transmitting side, the apparatus has a relatively high level of tolerance for interference signals. Thus even in the case where interference signals stemming from the communication with the information processing apparatus (STA-c) 230 reach the information processing apparatus (STA-a) 210, the latter is able to transmit data.

Here, the surrounding environment information refers to the information regarding the other information processing apparatuses that exist around a given information processing apparatus. This information is used to determine the transmitting power at the time of wireless communication. For example, the surrounding environment information includes the number of information processing apparatuses in the surroundings, their positions, the distances to these information processing apparatuses and their propagation losses, transmitting power levels used by these information processing apparatuses at the time of communication, their MCS (Modulation and Coding Scheme) index values, and receiving power threshold values. The surrounding environment information also includes the receiving power for previously received data, transmitting power for the data, data sources, data destinations, and types and priorities of the traffic in communication. Further included is information that allows these items of information to be estimated.

At least one of the above-mentioned items of information may be explicitly requested from other information processing apparatuses in order to acquire information that includes at least part of the requested information. Alternatively, the information may be acquired implicitly by a predetermined method over a predetermined time period. As another alternative, the information may be acquired from signals that were previously transmitted to the own apparatus or to the other information processing apparatuses for other purposes. The method of acquiring the information is not limited to the protocol in effect during the communication; the information may be acquired from upper-layer services instead. For example, the information may be acquired using other systems such as the GPS. In an environment such as infrastructure where the surrounding environment information is already known, the information may be input beforehand.

In FIG. 4, the information processing apparatus (STA-a) 210 uses, for example, the position information regarding the information processing apparatus (STA-b) 220 and information processing apparatus (STA-c) 230 as the surrounding environment information in determining the transmitting power for the RTS frame 301.

Upon receipt of the RTS frame 301, the information processing apparatus (STA-b) 220 transmits a CTS frame 302. At this time, as in the case of transmission of the RTS frame 301, the transmitting power is determined on the basis of the surrounding environment information about the information processing apparatus (STA-b) 220 preparatory to transmitting the CTS frame 302. The transmitting power in this case may be determined to be large enough to carry the frame unfailingly to the information processing apparatus (STA-a) 210 and to the information processing apparatus (STA-d) 240. This causes a NAV 306 to be set on the information processing apparatus (STA-d) 240. Because the information processing apparatus (STA-b) 220 is on the data-receiving side, the apparatus has a relatively low level of tolerance for interference signals. Thus setting the NAV 306 protects the information processing apparatus (STA-b) 220 against inadvertent data reception.

Also, the information processing apparatus (STA-b) 220 stores in the CTS frame 302 the transmitting power information explained above with reference to FIG. 3 as the information about the transmitting power preparatory to the frame transmission.

Next, the information processing apparatus (STA-a) 210 transmits a DATA frame 303 to the information processing apparatus (STA-b) 220. After this, the information processing apparatus (STA-b) 220 transmits an ACK frame 304 to the information processing apparatus (STA-a) 210. This brings the data transmission to an end.

Thereafter, the information processing apparatus (STA-a) 210 transmits a CF-END frame 305. At this time, the transmitting power is determined on the basis of the surrounding environment information and the transmitting power information stored in the CTS frame 302 before the CF-END frame 305 is transmitted. For example, the information processing apparatus (STA-a) 210 may determine the transmitting power based on the power at the time of receiving the CTS frame 302 and on the transmitting power information stored in the CTS frame 302. The transmitting power in this case may be determined to be large enough to carry the frame unfailingly to the information processing apparatus (STA-d) 240. Transmitting the CF-END frame 305 cancels the NAV 306 and enables the information processing apparatus (STA-d) 240 to communicate.

When the transmitting power is determined on the basis of the surrounding environment information as described above, the interference of signals is suitably controlled between the information processing apparatuses currently communicating and the information processing apparatuses in the surroundings. With the NAV controlled appropriately, the efficiency of utilization of the communication resources is improved. Incidentally, the increase in the efficiency of utilization of the communication resources through appropriate NAV control is called spatial reuse. Similar advantageous effects are obtained with the embodiments discussed below.

[Data Transmission Process]

Figure 5:
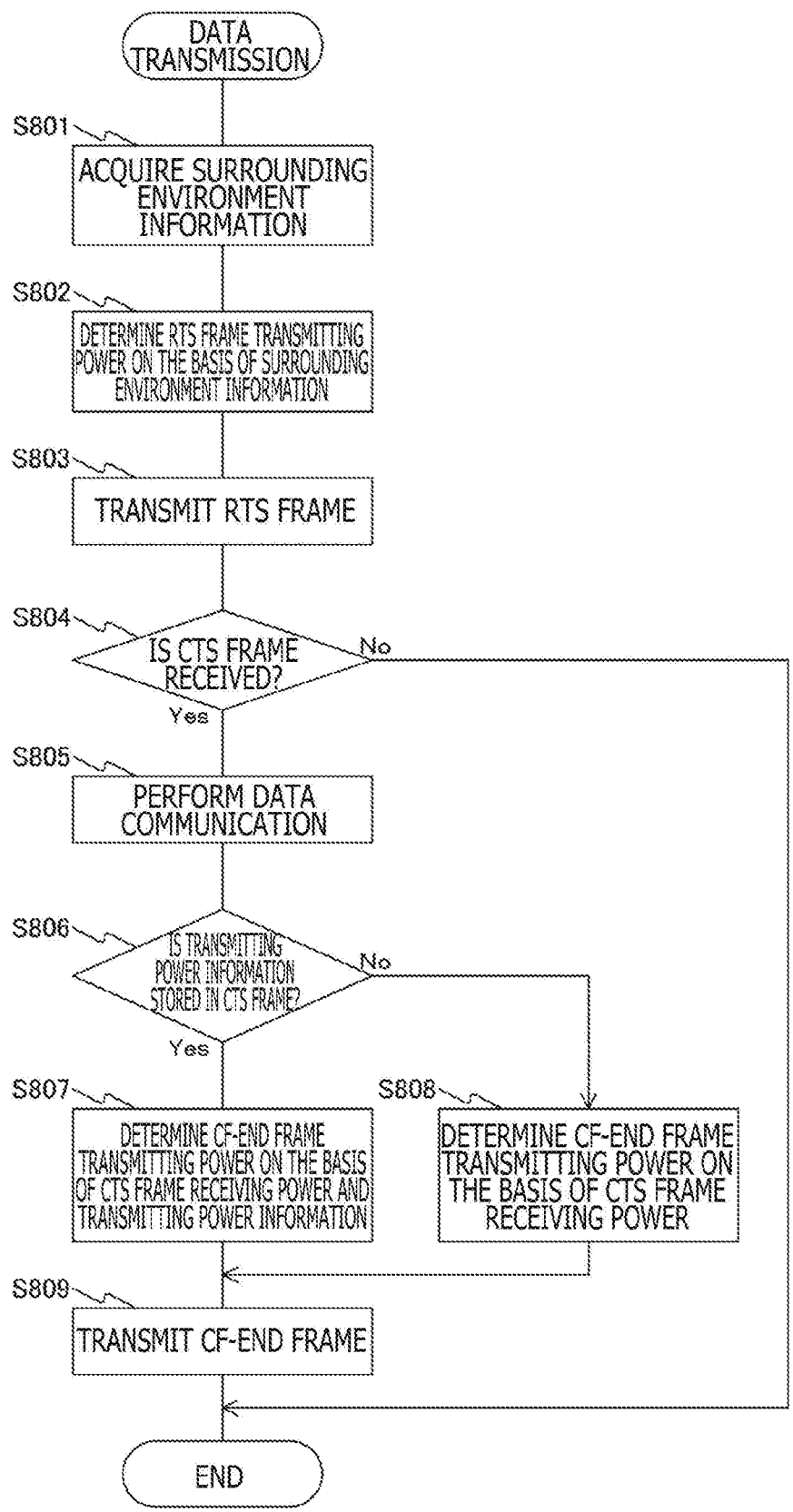
FIG. 5 is a flowchart depicting a typical processing procedure of data transmission performed by the first embodiment of the present technology.

FIG. 5 is a flowchart depicting a typical processing procedure of data transmission performed by the first embodiment of the present technology. The process outlined in this flowchart is performed by an information processing apparatus at the time of transmitting data. Specifically, this is the process carried out by the information processing apparatus (STA-a) 210 explained above with reference to FIG. 4.

First, the control part 150 acquires the surrounding environment information (step S801). The control part 150 then determines RTS frame transmitting power on the basis of the acquired surrounding environment information (step S802). The control part 150 then transmits an RTS frame (step S803). Next, the control part 150 determines whether or not a CTS frame is received (step S804). In the case where the CTS frame is received (Yes in step S804), the control part 150 performs data communication (step S805). The data communication is accomplished by transmitting the DATA frame and receiving the ACK frame, as explained above with reference to FIG. 4.

Next, the control part 150 determines whether or not transmitting power information is stored in the CTS frame received in step S804 (step S806). In the case where the transmitting power information is stored in the frame (Yes in step S806), the control part 150 determines CF-END frame transmitting power on the basis of the CTS frame receiving power and the stored transmitting power information (step S807), before reaching step S809. On the other hand, in the case where the transmitting power information is not stored in the frame (No in step S806), the control part 150 determines the CF-END frame transmitting power on the basis of the CTS frame receiving power (step S808), before reaching step S809.

In step S809, the control part 150 transmits the CF-END frame (step S809), thereby bringing the transmission process to an end. In the case where the CTS frame is not received in step S804 (No in step S804), the control part 150 also terminates the transmission process.

[Data Reception Process]

Figure 6:
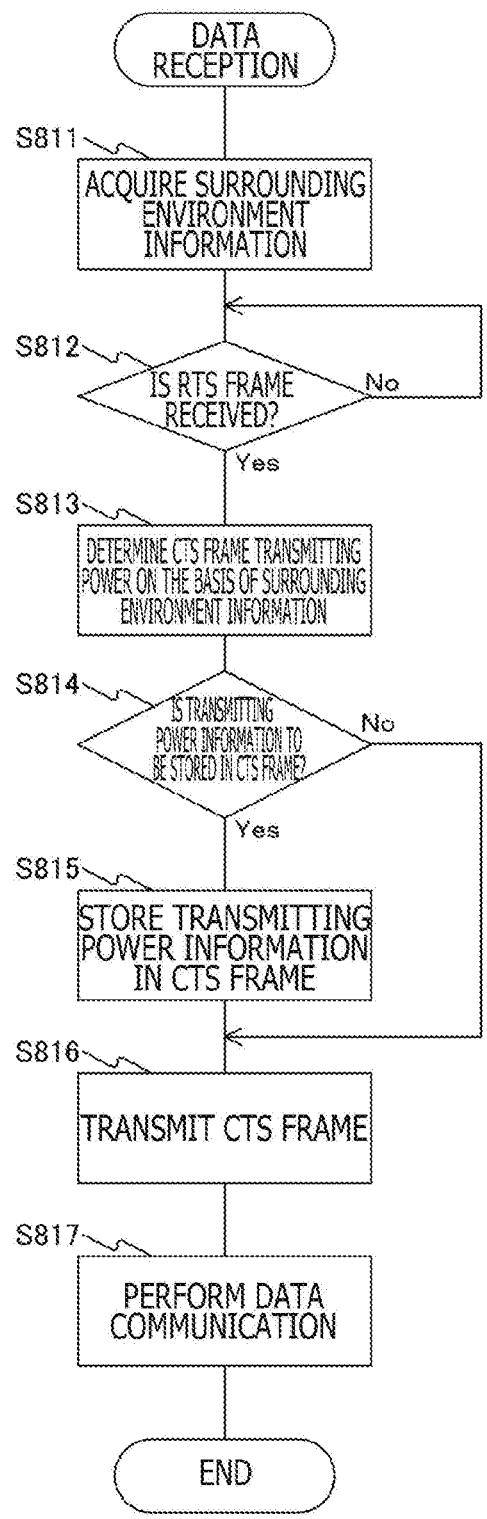
FIG. 6 is a flowchart depicting a typical processing procedure of data reception performed by the first embodiment of the present technology.

FIG. 6 is a flowchart depicting a typical processing procedure of data reception performed by the first embodiment of the present technology. The process outlined in this flowchart is performed by an information processing apparatus at the time of transmitting data. Specifically, this is the process carried out by the information processing apparatus (STA-b) 220 explained above with reference to FIG. 4.

First, the control part 150 acquires the surrounding environment information (step S811). The control part 150 then waits for an RTS frame to be received (step S812). In the case where the RTS frame is received (Yes in step S812), the control part 150 determines CTS frame transmitting power on the basis of the surrounding environment information (step S813). The control part 150 then determines whether or not to store the transmitting power information in a CTS frame (step S814). In the case where the transmitting power information is to be stored (Yes in step S814), the control part 150 stores the transmitting power information in the CTS frame (step S815), before reaching step S816. On the other hand, in the case where the transmitting power information is not to be stored (No in step S814), the control part 150 skips step S815 to reach step S816.

In step S816, the control part 150 transmits the CTS frame (step S816). The control part 150 then performs data communication (step S817), before bringing the data reception process to an end.

According to the above-described first embodiment of the present technology, the NAV is set and canceled appropriately by transmitting the RTS frame and other information using the transmitting power determined on the basis of the surrounding environment information. This improves the efficiency of utilization of the communication resources.

2. SECOND EMBODIMENT

In the first embodiment described above, the information processing apparatus as the data source transmits the CF-END frame. In a second embodiment of the present technology, by contrast, the information processing apparatus as the data destination also transmits the CF-END frame. This makes it possible for the data source to reduce the CF-END frame transmitting power. Because the reach range of the CF-END frame is limited, the NAV is canceled in a suitable manner, which improves the efficiency of utilization of the communication resources.

[Data Communication]

Figure 7:
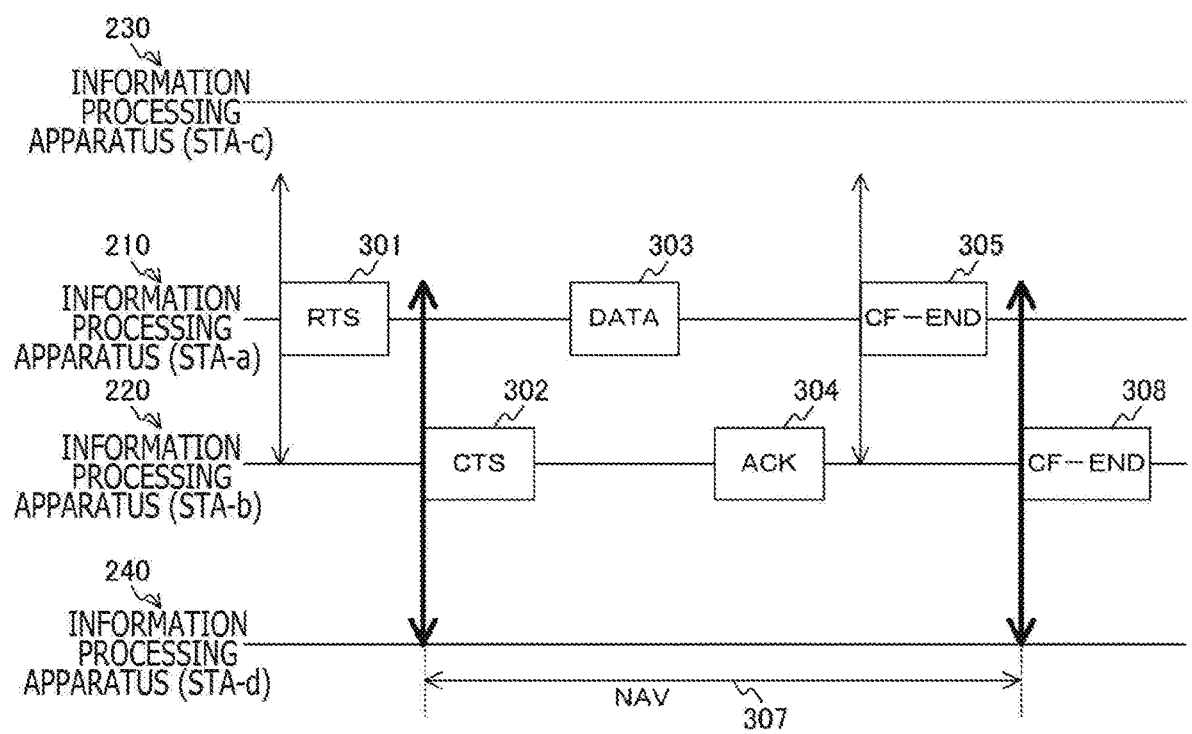
FIG. 7 is a schematic diagram depicting an example of data communication performed by a second embodiment of the present technology.

FIG. 7 is a schematic diagram depicting an example of data communication performed by the second embodiment of the present technology. Compared with the data communication explained above with reference to FIG. 4, the data communication outlined in FIG. 7 is different on the following points: First of all, the information processing apparatus (STA-a) 210 determines the transmitting power for the CF-END frame on the basis of surrounding environment information. The transmitting power may be determined to be large enough to carry the frame unfailingly to the information processing apparatus (STA-b) 220. After the CF-END frame 305 is transmitted by the information processing apparatus (STA-a) 210, the information processing apparatus (STA-b) 220 transmits another CF-END frame 308. At this time, the information processing apparatus (STA-b) 220 determines the transmitting power for the CF-END frame on the basis of surrounding environment information. The transmitting power may be determined to be large enough to carry the frame unfailingly to the information processing apparatus (STA-d) 240.

The CF-END frame 308 transmitted by the information processing apparatus (STA-b) 220 cancels a NAV 307 set on the information processing apparatus (STA-d) 240. For this reason, the transmitting power of the information processing apparatus (STA-a) 210 for the CF-END frame 305 is made substantially the same as the transmitting power for the RTS frame 301. This limits the reach range of the CF-END frame 305. Furthermore, the power consumption of the information processing apparatus (STA-a) 210 is reduced.

[Data Transmission Process]

Figure 8:
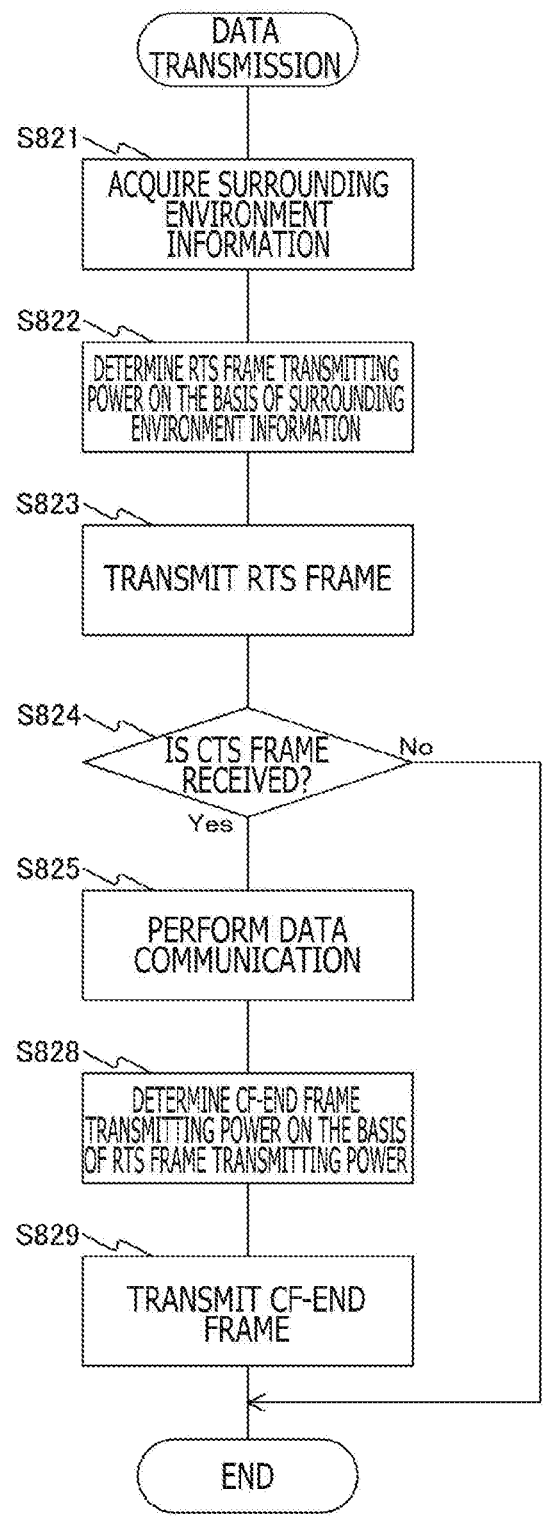
FIG. 8 is a flowchart depicting a typical processing procedure of data transmission performed by the second embodiment of the present technology.

FIG. 8 is a flowchart depicting a typical processing procedure of data transmission performed by the second embodiment of the present technology. First, the control part 150 acquires the surrounding environment information (step S821). The control part 150 then determines RTS frame transmitting power on the basis of the acquired surrounding environment information (step S822). Next, the control part 150 transmits an RTS frame (step S823). The control part 150 then determines whether or not a CTS frame is received (step S824). In the case where the CTS frame is received (Yes in step S824), the control part 150 performs data communication (step S825).

Next, the control part 150 determines CF-END frame transmitting power on the basis of the surrounding environment information. As indicated in the flowchart, the CF-END frame transmitting power is determined on the basis of the RTS frame transmitting power (step S828). The control part 150 then transmits a CF-END frame (step S829). After this, the control part 150 brings the transmission process to an end. On the other hand, in the case where the CTS frame is not received in step S824 (No in step S824), the control part 150 also terminates the transmission process.

[Data Reception Process]

Figure 9:
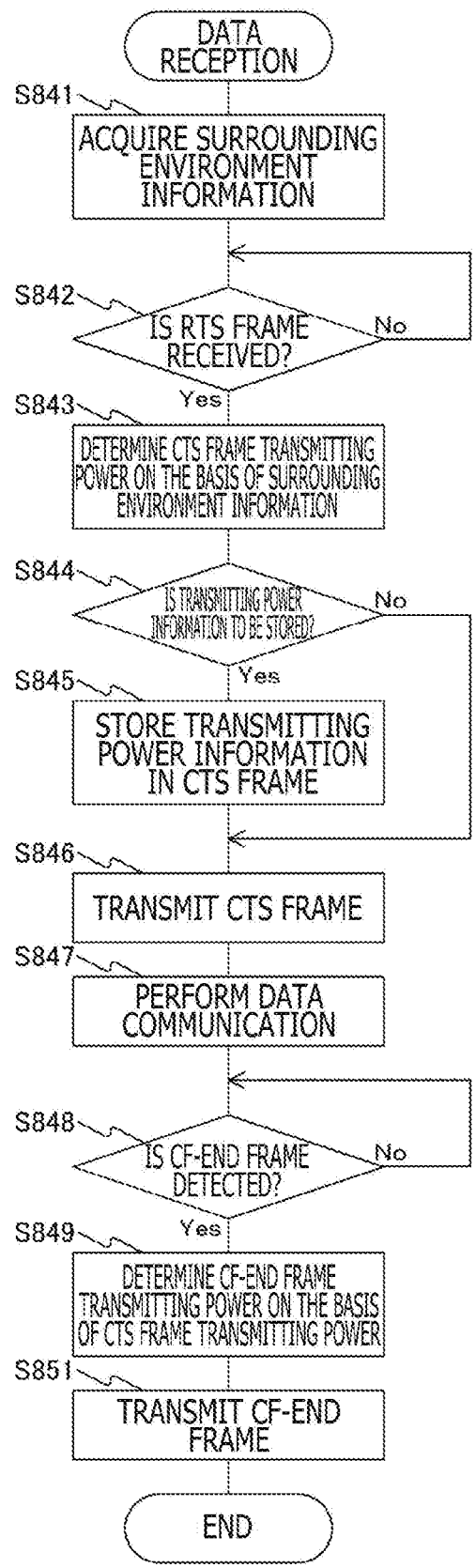
FIG. 9 is a flowchart depicting a typical processing procedure of data reception performed by the second embodiment of the present technology.

FIG. 9 is a flowchart depicting a typical processing procedure of data reception performed by the second embodiment of the present technology. First, the control part 150 acquires the surrounding environment information (step S841). The control part 150 then waits for an RTS frame to be received (step S842). In the case where the RTS frame is received (Yes in step S842), the control part 150 determines CTS frame transmitting power on the basis of the surrounding environment information (step S843). The control part 150 then determines whether or not to store the transmitting power information in the CTS frame (step S844). In the case where the transmitting power information is to be stored (Yes in step S844), the control part 150 stores the transmitting power information in the CTS frame (step S845), before reaching step S846. On the other hand, in the case where the transmitting power information is not to be stored in the frame (No in step S844), the control part 150 skips step S845 to reach step S846.

In step S846, the control part 150 transmits the CTS frame (step S846). The control part 150 then performs data communication (step S847). Next, the control part 150 waits for a CF-END frame to be detected (step S848). In the case where the CF-END frame sent from the information processing apparatus (STA-a) 210 is detected (Yes in step S848), the control part 150 determines CF-END frame transmitting power on the basis of the transmitting power for the CTS frame (step S849). The control part 150 then transmits the CF-END frame (step S851), before bringing the data transmission process to an end.

The rest of the configuration of the communication system 10 is substantially similar as the configuration of the communication system 10 described above in conjunction with the first embodiment of the present technology and thus will not be discussed further.

In the second embodiment of the present technology, as described above, the information processing apparatus (STA-b) 220 also transmits the CF-END frame to cancel the NAV set on the other information processing apparatuses in the surroundings. This reduces the transmitting power with which the information processing apparatus (STA-a) 210 transmits the CF-END frame. Also, the reach range of the CF-END frame is limited.

3. THIRD EMBODIMENT

With the above-described first embodiment, data is transmitted to an information processing apparatus as the single data destination. With a third embodiment of this technology, by contrast, the data source transmits the RTS frame to multiple data destinations that in turn send the CTS frame to the data source at the same time. This makes it possible to set the NAV appropriately when data is transmitted simultaneously to multiple data destinations, which improves the efficiency of utilization of the communication resources.

[Data Communication]

Figure 10:
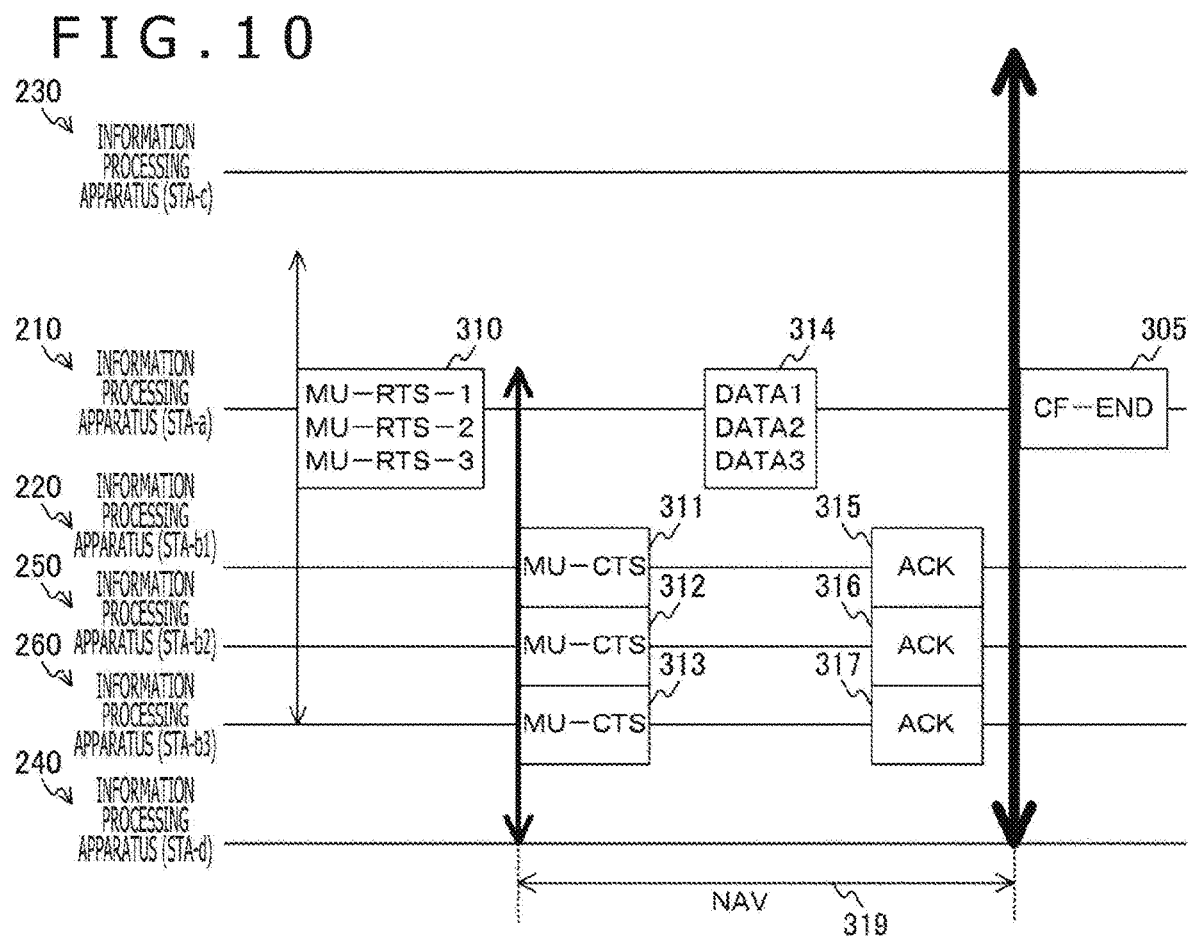
FIG. 10 is a schematic diagram depicting an example of data communication performed by a third embodiment of the present technology.

FIG. 10 is a schematic diagram depicting an example of data communication performed by the third embodiment of the present technology. This example of data communication is different from the data communication described above with reference to FIG. 4 in that data is transmitted to multiple information processing apparatuses. The diagram illustrates a typical case in which the information processing apparatus (STA-a) 210 transmits data to an information processing apparatus (STA-b1) 220, to an information processing apparatus (STA-b2) 250, and to an information processing apparatus (STA-b3) 260.

First, the information processing apparatus (STA-a) 210 transmits an MU-RTS frame 310 to the information processing apparatus (STA-b1) 220, to the information processing apparatus (STA-b2) 250, and to the information processing apparatus (STA-b3) 260. The MU-RTS frame 310 is constituted by three frames, i.e., MU-RTS-1, MU-RTS-2, and MU-RTS-3. The MU-RTS-1, MU-RTS-2, and MU-RTS-3 are the frames that correspond to the information processing apparatus (STA-b1) 220, information processing apparatus (STA-b2) 250, and information processing apparatus (STA-b3) 260, respectively. The MU-RTS frame 310 is spatially multiplexed or frequency-multiplexed when transmitted to the multiple information processing apparatuses.

At this time, the information processing apparatus (STA-a) 210 determines the transmission power for these frames on the basis of surrounding environment information. The transmission power may be determined to be large enough to carry the frames unfailingly to the information processing apparatus (STA-b1) 220, to the information processing apparatus (STA-b2) 250, and to the information processing apparatus (STA-b3) 260. Incidentally, the three MU-RTS frames may be transmitted at different transmitting power levels. Also, the three MU-RTS frames may be transmitted using the same transmitting power. In this case, the transmitting power is to be large enough to carry the frames unfailingly to the information processing apparatus with the largest propagation loss from among the information processing apparatus (STA-b1) 220, information processing apparatus (STA-b2) 250, and information processing apparatus (STA-b3) 260.

Next, the information processing apparatus (STA-b1) 220, information processing apparatus (STA-b2) 250, and information processing apparatus (STA-b3) 260 having received the MU-RTS frame 310 transmit an MU-CTS frame each. That is, the information processing apparatus (STA-b1) 220 transmits an MU-CTS 311 to the information processing apparatus (STA-a) 210; the information processing apparatus (STA-b2) 250 transmits an MU-CTS 312 to the information processing apparatus (STA-a) 210; and the information processing apparatus (STA-b3) 260 transmits an MU-CTS 313 to the information processing apparatus (STA-a) 210. At this time, the information processing apparatus (STA-b1) 220, information processing apparatus (STA-b2) 250, and information processing apparatus (STA-b3) 260 perform their transmissions using the transmitting power determined on the basis of the surrounding environment information. The transmitting power may be determined to be large enough to carry the frames unfailingly to the information processing apparatus (STA-a) 210 and to the information processing apparatus (STA-d) 240.

Incidentally, the three MU-CTS frames may be transmitted at different transmitting power levels. Also, the three MU-CTS frames may be transmitted using the same transmitting power. In the latter case, the transmitting power is to be large enough to carry the frames unfailingly to either the information processing apparatus (STA-a) 210 or the information processing apparatus (STA-d) 240 having the larger propagation loss of the two.

Next, data communication is performed by exchanging DATA frames 314 (DATA1 to DATA3) and ACK frames 315 to 317. The information processing apparatus (STA-a) 210 then transmits a CF-END frame 305. At this time, the information processing apparatus (STA-a) 210 determines the transmitting power for the CF-END frame 305 on the basis of the MU-CTS frame receiving power and of the transmitting power information stored in the MU-CTS frame.

[Data Transmission Process]

Figure 11:
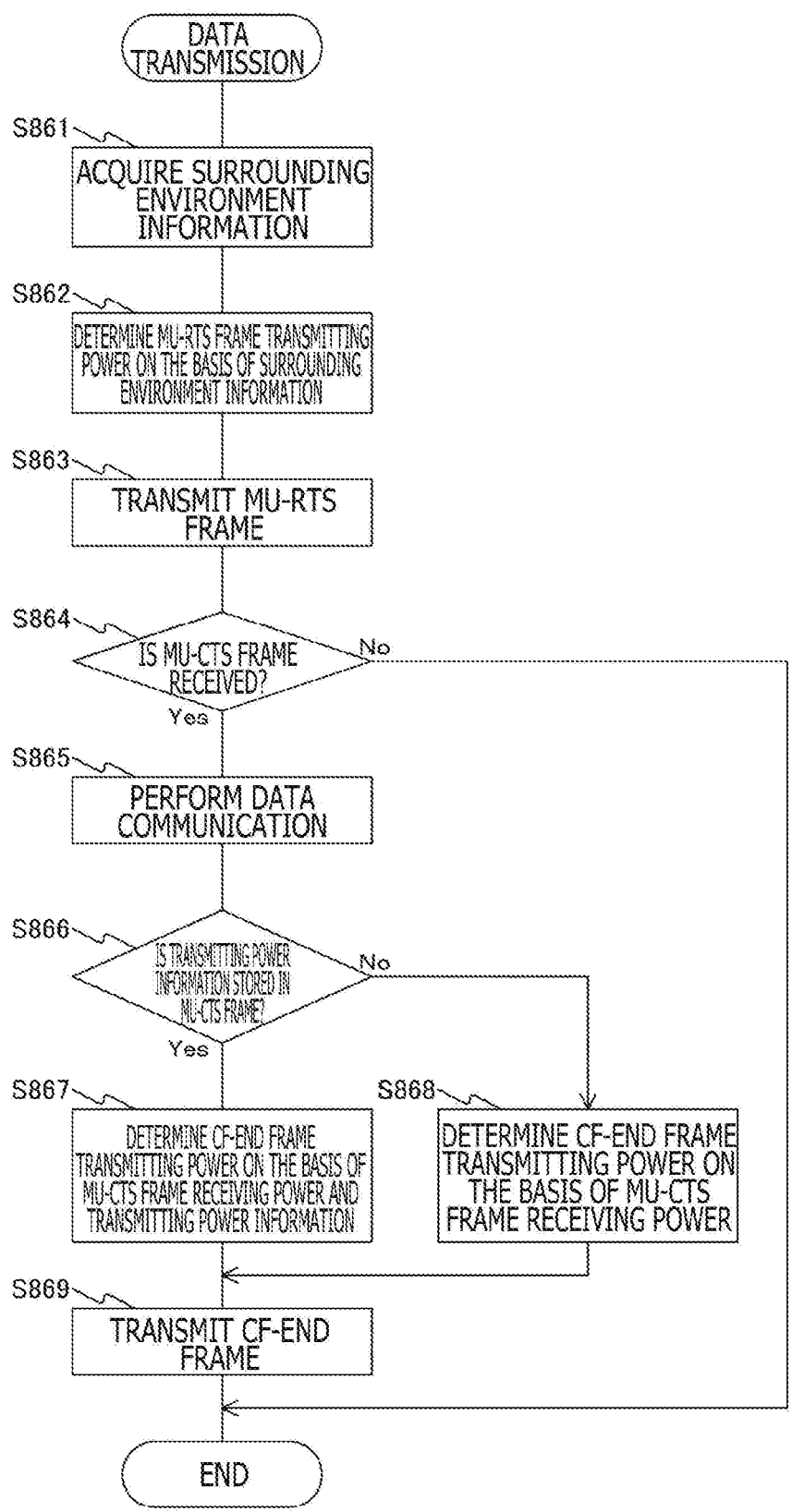
FIG. 11 is a flowchart depicting a typical processing procedure of data transmission performed by the third embodiment of the present technology.

FIG. 11 is a flowchart depicting a typical processing procedure of data transmission performed by the third embodiment of the present technology. First, the control part 150 acquires the surrounding environment information (step S861). The control part 150 then determines MU-RTS frame transmitting power on the basis of the acquired surrounding environment information (step S862). Next, the control part 150 transmits an MU-RTS frame (step S863). The control part 150 then determines whether or not an MU-CTS frame is received (step S864). In the case where the CTS frame is received (Yes in step S864), the control part 150 performs data communication (step S865).

Next, the control part 150 determines whether or not transmitting power information is stored in the MU-CTS frame received in step S864 (step S866). In the case where the transmitting power information is stored in the frame (Yes in step S866), the control part 150 determines CF-END frame transmitting power on the basis of MU-CTS frame receiving power and of the transmitting power information (step S867), before reaching step S869. On the other hand, in the case where the transmitting power information is not stored in the frame (No in step S866), the control part 150 determines the CF-END frame transmitting power on the basis of the MU-CTS frame receiving power (step S868), before reaching step S869.

In step S869, the control part 150 transmits a CF-END frame (step S868), thereby bringing the transmission process to an end. In the case where the MU-CTS frame is not received in step S864 (No in step S864), the control part 150 also terminates the transmission process.

[Data Reception Process]

Figure 12:
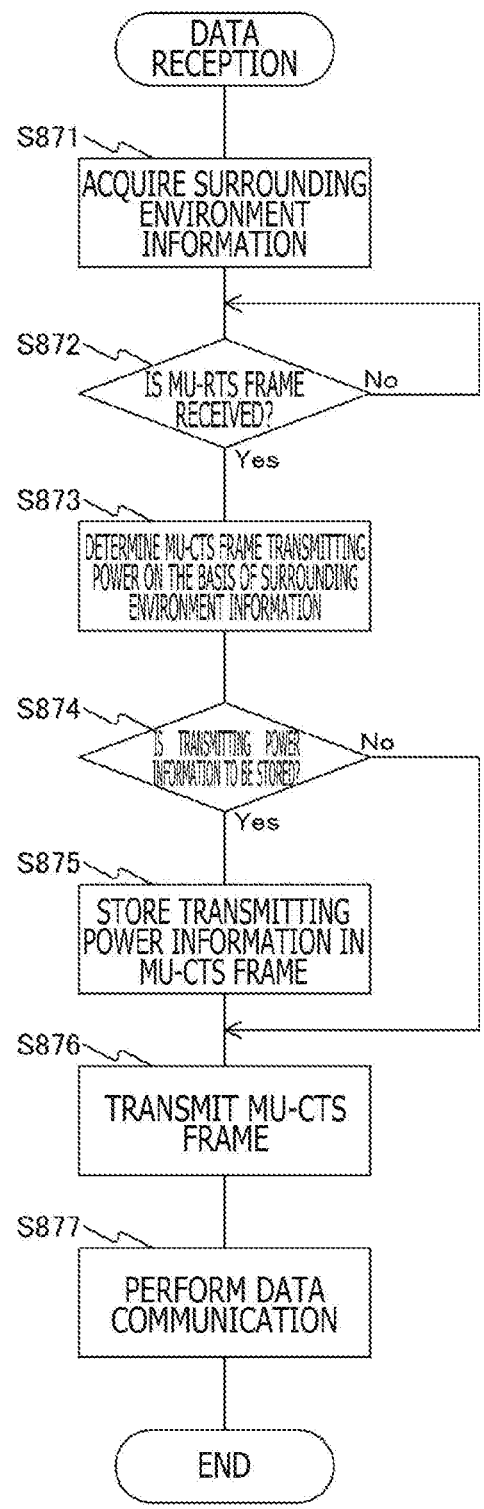
FIG. 12 is a flowchart depicting a typical processing procedure of data reception performed by the third embodiment of the present technology.

FIG. 12 is a flowchart depicting a typical processing procedure of data reception performed by the third embodiment of the present technology. First, the control part 150 acquires the surrounding environment information (step S871). The control part 150 then waits for an MU-RTS frame to be received (step S872). In the case where the MU-RTS frame is received (Yes in step S872), the control part 150 determines MU-CTS frame transmitting power on the basis of the surrounding environment information (step S873). The control part 150 then determines whether or not to store the transmitting power information in an MU-CTS frame (step S874). In the case where the transmitting power information is to be stored (Yes in step S874), the control part 150 stores the transmitting power information in the MU-CTS frame (step S875), before reaching step S876. On the other hand, in the case where the transmitting power information is not to be stored in the frame (No in step S874), the control part 150 skips step S875 to reach step S876.

In step S876, the control part 150 transmits the MU-CTS frame (step S876). The control part 150 then performs data communication (step S877), before bringing the data reception process to an end.

With the third embodiment of the present technology, as described above, the NAV is suitably set at the time of multiplex transmission, which improves the efficiency of utilization of the communication resources.

4. FOURTH EMBODIMENT

In the above-described first embodiment, the information processing apparatus as the data source transmits the RTS frame. In a fourth embodiment of the present technology, by contrast, an information processing apparatus transmits a CTS-to-Self frame to simplify the transmission and reception of frames when transmitting or receiving data. At this time, each information processing apparatus transmits the CTS-to-Self frame at a different transmitting power level. This allows the NAV to be set appropriately in the case of transmitting or receiving data, which improves the efficiency of utilization of the communication resources.

[Data Communication]

Figure 13:
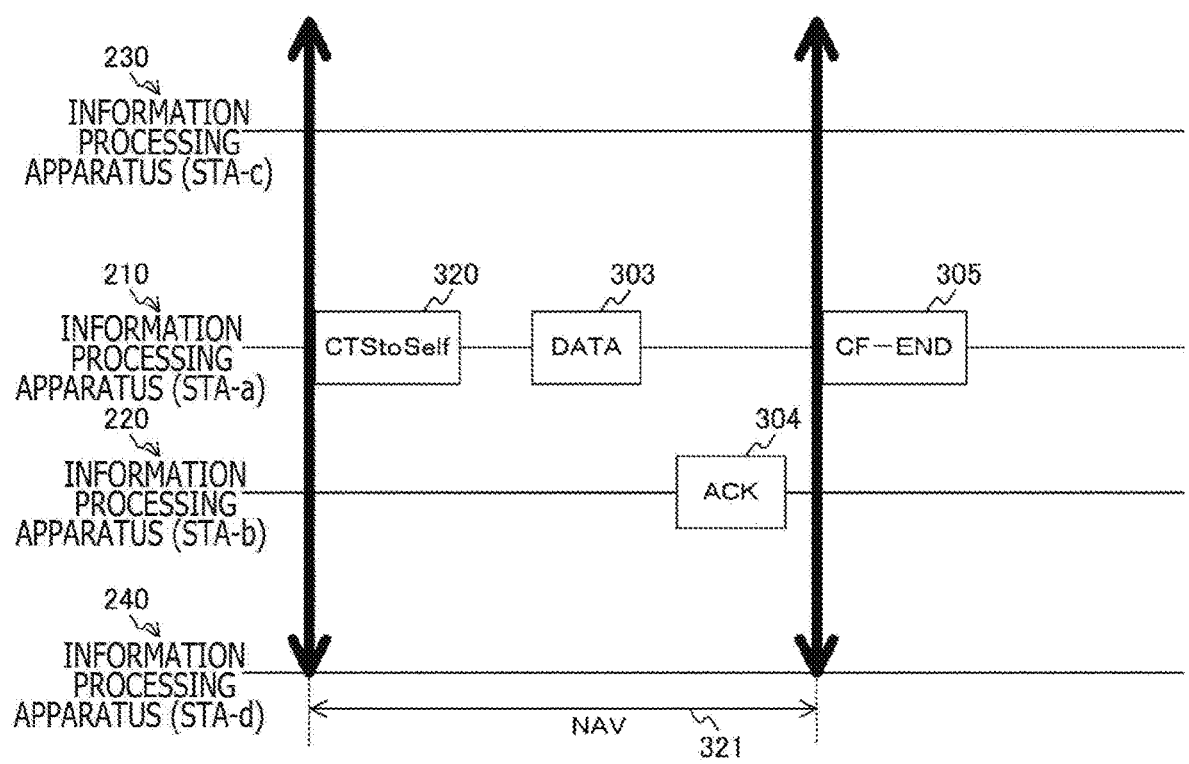
FIG. 13 is a schematic diagram depicting an example of data communication performed by a fourth embodiment of the present technology.

FIG. 13 is a schematic diagram depicting an example of data communication performed by the fourth embodiment of the present technology. The diagram illustrates a typical case in which the information processing apparatus (STA-a) 210 transmits the CTS-to-Self frame while also transmitting data. Here, the CTS-to-Self fame is a frame used to allow the own apparatus to transmit data and to request the other information processing apparatuses to set the NAV. Transmitting the CTS-to-Self frame notifies the other information processing apparatuses in the surroundings that data is about to be transmitted. Transmission of the frame causes the NAV to be set at the same time. This simplifies the exchanges of RTS and CTS frames between the apparatuses.

First, the information processing apparatus (STA-a) 210 transmits a CTS-to-Self frame 320. At this time, the information processing apparatus (STA-a) 210 sets the transmitting power on the basis of its own surrounding environment information and of previously acquired destination surrounding environment information. Here, the destination surrounding environment information means the surrounding environment information regarding the information processing apparatus acting as the data destination. In the diagram, the surrounding environment information regarding the information processing apparatus (STA-b) 220 represents the destination surrounding environment information. The information processing apparatus (STA-a) 210 determines transmitting power to be large enough to carry the frame unfailingly to the information processing apparatus (STA-d) 240. Transmitting the CTS-to-Self frame sets a NAV 321 on the information processing apparatus (STA-d) 240.

Next, the information processing apparatus (STA-a) 210 transmits a DATA frame 303 to the information processing apparatus (STA-b) 220, and the information processing apparatus (STA-b) 220 transmits an ACK frame 304 to the information processing apparatus (STA-a) 210. This enables data communication to be carried out.

Then the information processing apparatus (STA-a) 210 transmits a CF-END frame 305. At this time, the information processing apparatus (STA-a) 210 determines the transmitting power on the basis of its own surrounding environment information and of the destination surrounding environment information. In the diagram, the transmitting power may be determined to be substantially the same as that for the CTS-to-Self frame 320. This cancels the NAV 321 set on the information processing apparatus (STA-d) 240.

FIG. 14 is a schematic diagram depicting another example of data communication performed by the fourth embodiment of the present technology. The diagram illustrates a typical case in which the information processing apparatus (STA-a) 210 transmits a CTS-to-Self frame and also receives data.

First, the information processing apparatus (STA-a) 210 transmits a CTS-to-Self frame 320. At this time, the information processing apparatus (STA-a) 210 determines the transmitting power on the basis of the surrounding environment information. The transmitting power may be determined to be large enough to carry the frame to the information processing apparatus (STA-c) 230. Transmitting the CTS-to-Self frame 320 sets a NAV 325 on the information processing apparatus (STA-c) 230.

Next, the information processing apparatus (STA-a) 210 transmits a Trigger frame 322 to the information processing apparatus (STA-b) 220. The Trigger frame is used to request data transmission in the reverse direction and to prompt data transmission. The frame causes the information processing apparatus (STA-b) 220 to transmit a DATA frame 323 to the information processing apparatus (STA-a) 210. After this, the information processing apparatus (STA-a) 210 transmits an ACK frame 324, thereby bringing the data communication to an end.

Then the information processing apparatus (STA-a) 210 transmits a CF-END frame 305. At this time, the information processing apparatus (STA-a) 210 determines the transmitting power on the basis of the surrounding environment information. In the illustrated example, the transmitting power may be determined to be substantially the same as that for the CTS-to-Self frame 320. Transmitting the CF-END frame 305 cancels the NAV 325 set on the information processing apparatus (STA-c) 230.

[Data Transmission and Reception Process]

Figure 15:
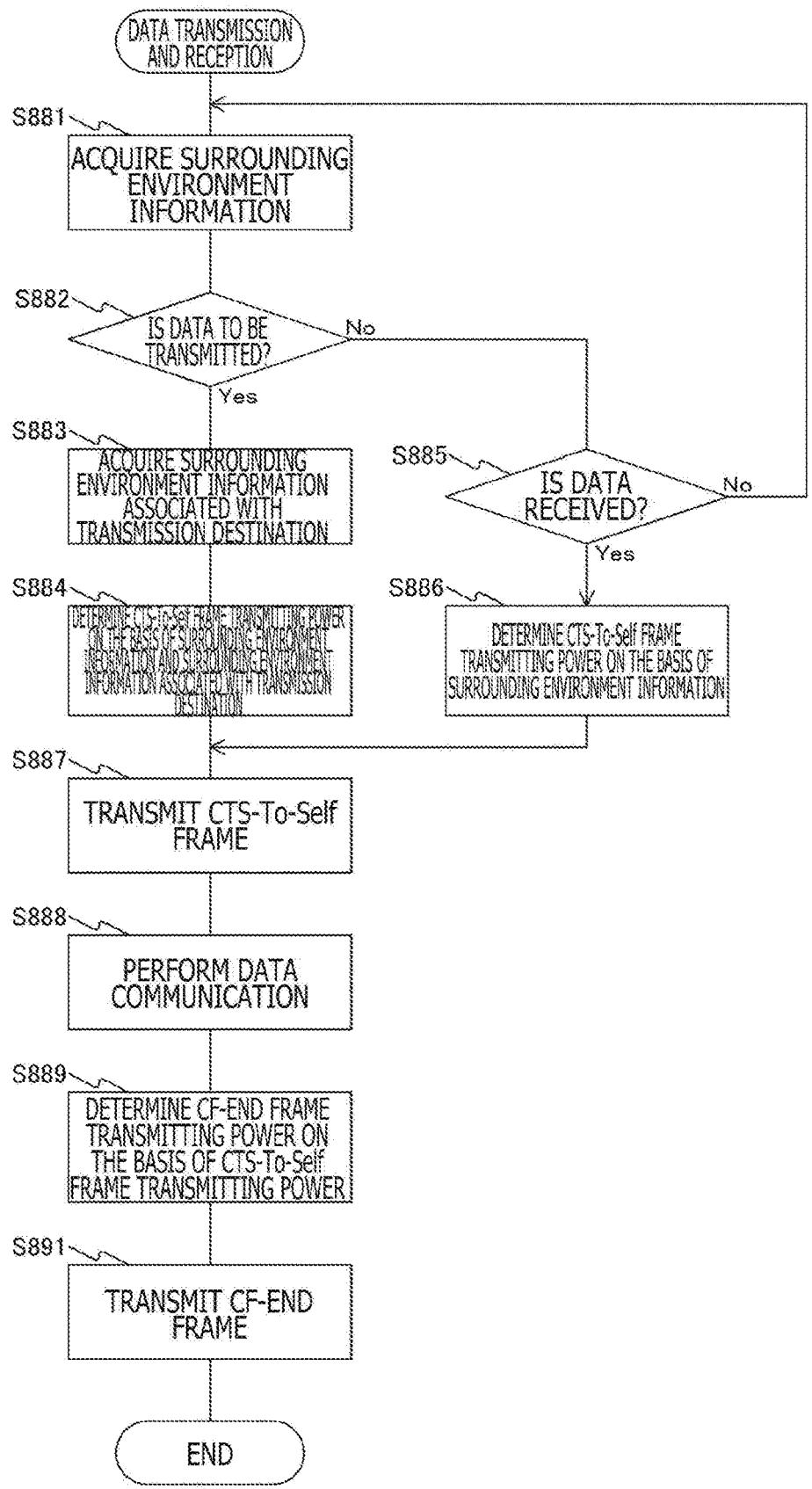
FIG. 15 is a flowchart depicting a typical processing procedure of data transmission and reception performed by the fourth embodiment of the present technology.

FIG. 15 is a flowchart depicting a typical processing procedure of data transmission and reception performed by the fourth embodiment of the present technology. First, the control part 150 acquires the surrounding environment information (step S881). The control part 150 then determines whether or not to transmit data (step S882). In the case where data is to be transmitted (Yes in step S882), the control part 150 acquires the destination surrounding environment information (step S883). Next, the control part 150 determines the transmitting power for the CTS-to-Self frame on the basis of the surrounding environment information and of the destination surrounding environment information (step S884), before reaching step S887.

On the other hand, in the case where data is not to be transmitted in step S882 (No in step S882), the control part 150 determines whether or not to receive data (step S885). In the case where data is not to be received (No in step S885), the control part 150 repeats the process from step S881. In the case where data is to be received (Yes in step S885), the control part 150 determines the CTS-to-Self transmitting power on the basis of the surrounding environment information (step S886), before reaching step S887.

In step S887, the control part 150 transmits the CTS-to-Self frame (step S887). Next, the control part 150 performs data communication (step S888). The control part 150 then determines the transmitting power for a CF-END frame on the basis of the CTS-to-Self frame transmitting power (step S889). The control part 150 thereafter transmits the CF-END frame (step S891), thereby bringing the data transmission and reception process to an end.

The process performed by the information processing apparatus (STA-b) 220 is substantially similar as that of normal data reception and thus will not be discussed further. Also, the rest of the configuration of the communication system 10 is substantially similar as the configuration of the communication system 10 described above in conjunction with the first embodiment of the present technology and thus will not be explained further.

In the above-described fourth embodiment of the present technology, when the information processing apparatus as the data source transmits the CTS-to-Self frame for data transmission or reception, the transmitting power level at which the CTS-to-Self frame is transmitted for data transmission is different from the transmitting power level at which the CTS-to-Self frame is transmitted for data reception. This makes it possible to set the NAV appropriately in each of the cases of data transmission and reception. This improves the efficiency of utilization of the communication resources.

5. APPLICATION EXAMPLES

The technology of the present disclosure may be applied to diverse products. For example, the information processing apparatus 100 may be implemented in the form of a mobile terminal such as a smartphone, a tablet PC (personal computer), a laptop PC, a portable game terminal, or a digital camera; in the form of a stationary terminal such as a TV set, a printer, a digital scanner, or network storage; or in the form of a vehicle-mounted terminal such as a car navigation system. The information processing apparatus 100 may also be implemented as an MTC (machine-type communication) terminal that performs M2M (machine-to-machine) communication, such as a smart meter, an automatic vending machine, or a POS (point-of-sale) terminal. Furthermore, the information processing apparatus 100 may be implemented as a wireless communication module (e.g., an integrated circuit module constituted by a single die) mounted on any of these terminals.

On the other hand, the information processing apparatus 100 may be implemented, for example, as a wireless LAN access point (also called a wireless base station) with or without router capabilities. As another alternative, the information processing apparatus 100 and the information processing apparatuses (STA) may each be implemented as a mobile wireless LAN router. Further, the information processing apparatus 100 may be implemented as a wireless communication module (e.g., an integrated circuit module formed by a single die) mounted on any of these apparatuses.

5-1. First Application Example

Figure 16:
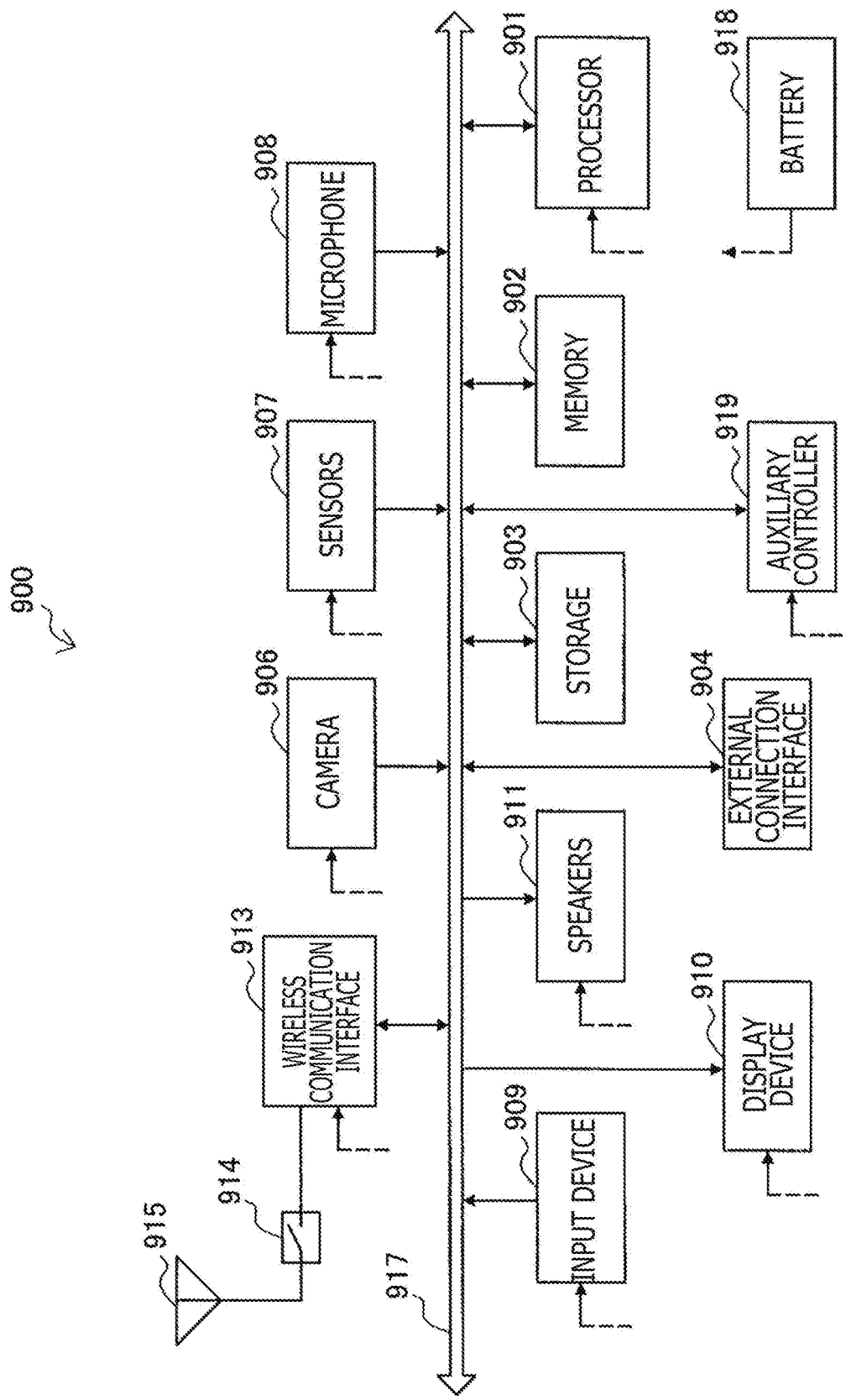
FIG. 16 is a block diagram depicting a typical overall configuration of a smartphone 900 to which the technology of the present disclosure may be applied.

FIG. 16 is a block diagram depicting a typical overall configuration of a smartphone 900 to which the technology of the present disclosure may be applied. The smartphone 900 includes a processor 901, a memory 902, storage 903, an external connection interface 904, a camera 906, sensors 907, a microphone 908, an input device 909, a display device 910, speakers 911, a wireless communication interface 913, an antenna switch 914, an antenna 915, a bus 917, a battery 918, and an auxiliary controller 919.

The processor 901 may be a CPU (central processing unit) or an SoC (system-on-chip) that controls the functions of the smartphone 900 on the application layer and other layers. The memory 902 includes a RAM (random access memory) and a ROM (read-only memory), and stores programs and data for execution by the processor 901. The storage 903 may include storage media such as a semiconductor memory or a hard disk. The external connection interface 904 is used to connect an external device such as a memory card or a USB (Universal Serial Bus) device with the smartphone 900.

The camera 906 includes, for example, an imaging element such as a CCD (charge-coupled device) or a CMOS (complementary metal oxide semiconductor) that generates captured images. The sensors 907 may include a group of sensors such as a positioning sensor, a gyro sensor, a geomagnetic sensor, and an acceleration sensor. The microphone 908 converts the sound input to the smartphone 900 into an audio signal. The input device 909 includes, for example, a touch sensor that detects touches on the screen of the display device 910, a keypad, a keyboard, buttons, or switches, and receives operations performed by or information input from the user. The display device 910 has a screen such as a liquid crystal display (LCD) or an organic light-emitting diode (OLED) display that displays images output from the smartphone 900. The speakers 911 convert the audio signal output from the smartphone 900 into sounds.

The wireless communication interface 913 supports at least one of the wireless LAN standards such as IEEE 802.11a, IEEE 802.11b, IEEE 802.11g, IEEE 802.11n, IEEE 802.11ac, and IEEE 802.11ad, and performs wireless communication. In infrastructure mode, the wireless communication interface 913 can communicate with another apparatus via a wireless LAN access point. In direct communication mode such as ad-hoc mode or Wi-Fi Direct mode, the wireless communication interface 913 can communicate directly with another apparatus. In Wi-Fi Direct mode, unlike in ad-hoc mode, one of the two communicating terminals acts as an access point, with communication taking place directly between these terminals. Typically, the wireless communication interface 913 may include a baseband processor, an RF (radio frequency) circuit, and a power amplifier. The wireless communication interface 913 may be a one-chip module that integrates a memory for storing a communication control program, a processor for executing the program, and related circuits. In addition to the wireless LAN system, the wireless communication interface 913 may support other types of wireless communication systems such as near-field communication, close proximity communication system, or cellular communication. The antenna switch 914 switches the connection points of the antenna 915 to which to connect multiple circuits (e.g., for different wireless communication systems) included in the wireless communication interface 913. The antenna 915 has one or multiple antenna elements (e.g., those that make up a multi-input multi-output (MIMO) antenna), and is used by the wireless communication interface 913 for transmitting and receiving wireless signals.

The example in FIG. 16 is not limitative of how the smartphone 900 is configured. Alternatively, the smartphone 900 may have multiple antennas (e.g., one for wireless LAN, one for the close proximity communication system, etc.). In this case, the antenna switch 914 may be omitted from the configuration of the smartphone 900.

The bus 917 interconnects the processor 901, memory 902, storage 903, external connection interface 904, camera 906, sensors 907, microphone 908, input device 909, display device 910, speakers 911, wireless communication interface 913, and auxiliary controller 919. The battery 918 supplies power to the blocks of the smartphone 900 depicted in FIG. 16 via feeder lines indicated partially by broken lines in the diagram. The auxiliary controller 919 activates minimal functions of the smartphone 900 in sleep mode, for example.

In the smartphone 900 depicted in FIG. 16, the control part 150 discussed above with reference to FIG. 2 may be implemented using the wireless communication interface 913. Also, at least part of the above-described functions may be implemented using the processor 901 or auxiliary controller 919. For example, when the RTS frame is transmitted by the control part 150 using the transmitting power determined on the basis of the surrounding environment information, the efficiency of utilization of the communication resources is improved. This in turn reduces the power consumption of the battery 918.

Incidentally, the smartphone 900 may operate as a wireless access point (software AP) by getting the processor 901 to execute the access point function on the application level. Alternatively, the wireless communication interface 913 may include a wireless access point function.

5-2. Second Application Example

Figure 17:
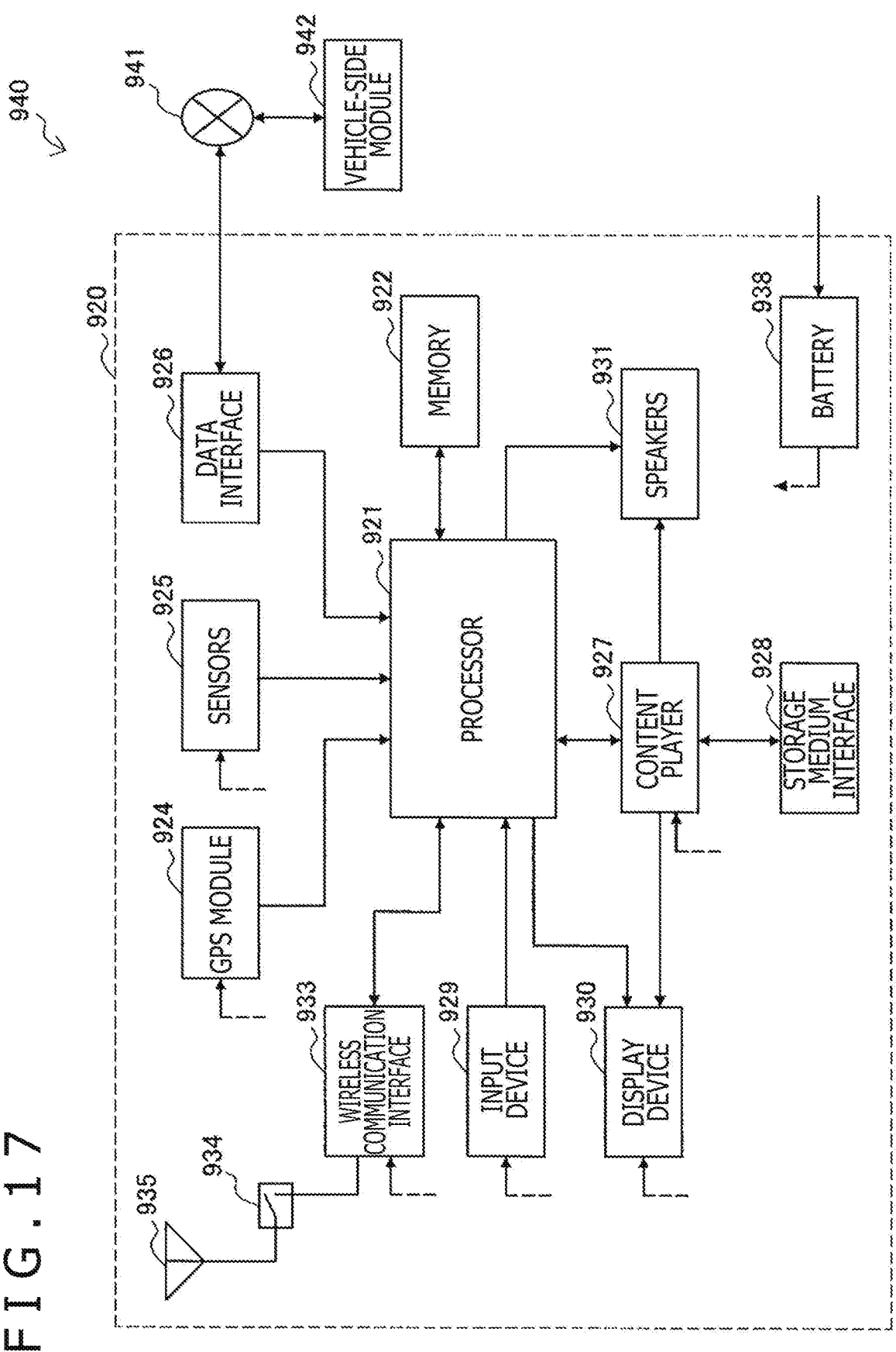
FIG. 17 is a block diagram depicting a typical overall configuration of a car navigation system 920 to which the technology of the present disclosure may be applied.

FIG. 17 is a block diagram depicting a typical overall configuration of a car navigation system 920 to which the technology of the present disclosure may be applied. The car navigation system 920 includes a processor 921, a memory 922, a GPS (global positioning system) module 924, sensors 925, a data interface 926, a content player 927, a storage medium interface 928, an input device 929, a display device 930, speakers 931, a wireless communication interface 933, an antenna switch 934, an antenna 935, and a battery 938.

The processor 921 may be a CPU or an SoC, for example, which controls the car navigation function and other functions of the car navigation system 920. The memory 922 includes a RAM and a ROM, and stores programs and data for execution by the processor 921.

The GPS module 924 measures the position of the car navigation system 920 (e.g., in latitude, longitude, and altitude) using GPS signals received from GPS satellites. The sensors 925 may include a group of sensors such as a gyro sensor, a geomagnetic sensor, and an atmospheric pressure sensor. The data interface 926 is connected, for example, to an onboard network 941 via a terminal, not illustrated, and acquires data such as vehicle speed data generated on the side of the vehicle.

The content player 927 reproduces content stored on a storage medium (e.g., CD or DVD) loaded into the storage medium interface 928. The input device 929 includes, for example, a touch sensor that detects touches on the screen of the display device 930, buttons, or switches, and receives operations performed by or information input from the user. The display device 930 has a screen such as an LCD or an OLED display that displays images from the navigation function or from the content being reproduced. The speakers 931 output sounds from the navigation function or from the content being reproduced.

The wireless communication interface 933 performs wireless communication by supporting at least one of the wireless LAN standards such as IEEE 802.11a, IEEE 802.11b, IEEE 802.11g, IEEE 802.11n, IEEE 802.11ac, and IEEE 802.11ad. In infrastructure mode, the wireless communication interface 933 can communicate with another apparatus via a wireless LAN access point. In direct communication mode such as ad-hoc mode or Wi-Fi Direct mode, the wireless communication interface 933 can communicate directly with another apparatus. Typically, the wireless communication interface 933 may include a baseband processor, an RF circuit, and a power amplifier. The wireless communication interface 933 may be a one-chip module that integrates a memory for storing a communication control program, a processor for executing the program, and related circuits. In addition to the wireless LAN system, the wireless communication interface 933 may support other types of wireless communication systems such as near-field communication, close proximity communication system, or cellular communication. The antenna switch 934 switches the connection points of the antenna 935 to which to connect multiple circuits included in the wireless communication interface 933. The antenna 935 has one or multiple antenna elements and is used by the wireless communication interface 933 for transmitting and receiving wireless signals.

The example in FIG. 17 is not limitative of how the car navigation system 920 is configured. Alternatively, the car navigation system 920 may have multiple antennas. In this case, the antenna switch 934 may be omitted from the configuration of the car navigation system 920.

The battery 938 supplies power to the blocks of the car navigation system 920 illustrated in FIG. 17 via feeder lines indicated partially by broken lines in the diagram. The battery 938 further stores power fed from the side of the vehicle.

In the car navigation system 920 depicted in FIG. 17, the control part 150 discussed above with reference to FIG. 2 may be implemented using the wireless communication interface 933. Also, at least part of the above-described functions may be implemented using the processor 921. For example, when the RTS frame is transmitted by the car navigation system 920 using the transmitting power determined on the basis of the surrounding environment information, the efficiency of utilization of the communication resources is improved.

Also, the wireless communication interface 933 may operate as the above-described information processing apparatus 100, providing wireless connection to the terminal carried by the user riding in the vehicle.

Furthermore, the technology of the present disclosure may be implemented in the form of an onboard system (or vehicle) 940 including at least one block of the above-described car navigation system 920, the onboard network 941, and a vehicle-side module 942. The vehicle-side module 942 generates vehicle-side data such as engine revolutions or failure information and outputs the generated data onto the onboard network 941.

5-3. Third Application Example

Figure 18:
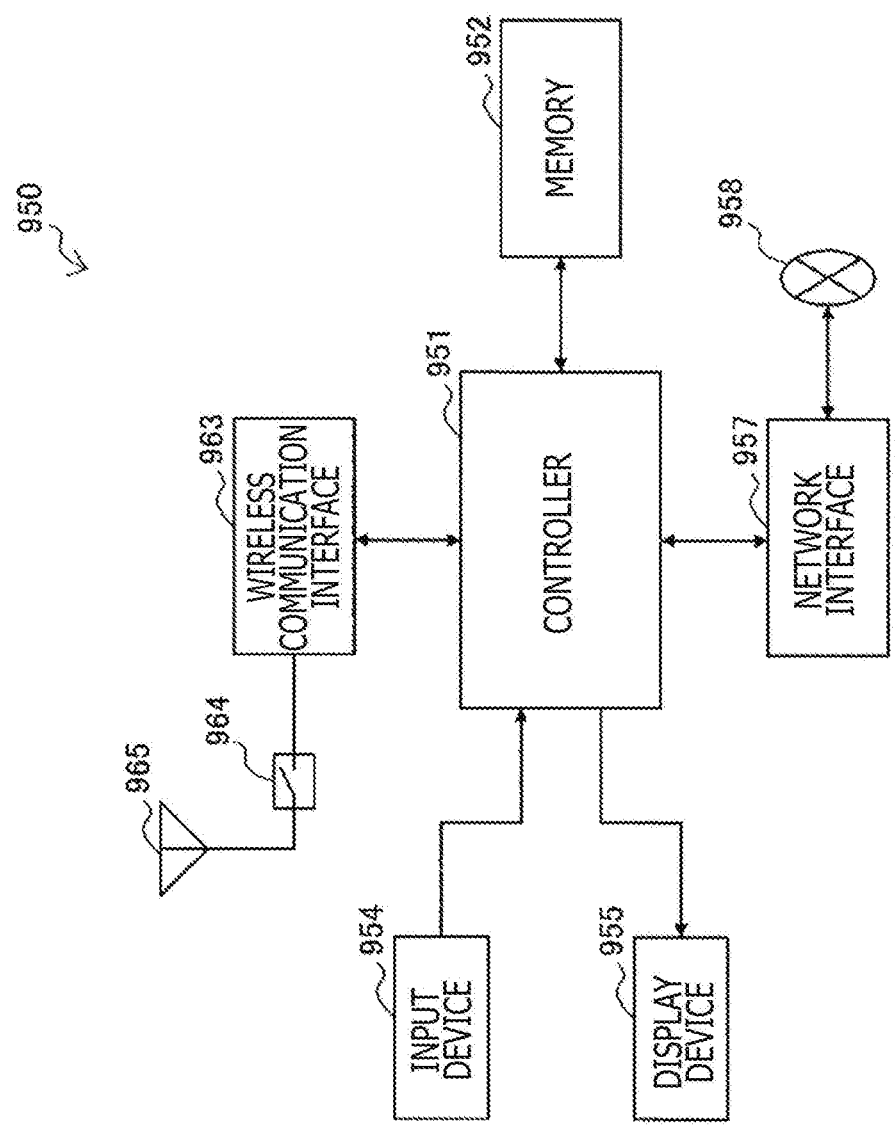
FIG. 18 is a block diagram depicting a typical overall configuration of a wireless access point 950 to which the technology of the present disclosure may be applied.

FIG. 18 is a block diagram depicting a typical overall configuration of a wireless access point 950 to which the technology of the present disclosure may be applied. The wireless access point 950 includes a controller 951, a memory 952, an input device 954, a display device 955, a network interface 957, a wireless communication interface 963, an antenna switch 964, and an antenna 965.

The controller 951 may be a CPU or a DSP (digital signal processor), for example. The controller 951 activates the diverse functions of the wireless access point 950 (e.g., access restriction, routing, encryption, firewall, and log management) on the IP (Internet Protocol) layer and upper layers. The memory 952 includes a RAM and a ROM, and stores programs for execution by the controller 951 as well as various control data (e.g., terminal list, routing table, encryption keys, security settings, and logs).

The input device 954 includes buttons or switches, for example, and receives operations performed by the user. The display device 955 includes LED lamps, for example, which display the operating status of the wireless access point 950.

The network interface 957 is a wired communication interface for connecting the wireless access point 950 to a wired communication network 958. The network interface 957 may include multiple connection terminals. The wired communication network 958 may be a LAN such as the Ethernet (registered trademark) or a WAN (wide area network).

The wireless communication interface 963 supports at least one of the wireless LAN standards such as IEEE 802.11a, IEEE 802.11b, IEEE 802.11g, IEEE 802.11n, IEEE 802.11ac, and IEEE 802.11ad. The wireless communication interface 963 acting as an access point provides wireless connection for nearby terminals. Typically, the wireless communication interface 963 may include a baseband processor, an RF circuit, and a power amplifier. The wireless communication interface 963 may be a one-chip module that integrates a memory for storing a communication control program, a processor for executing the program, and related circuits. The antenna switch 964 switches the connection points of the antenna 965 to which to connect multiple circuits included in the wireless communication interface 963. The antenna 965 has one or multiple antenna elements and is used by the wireless communication interface 963 for transmitting and receiving wireless signals.

In the wireless access point 950 depicted in FIG. 18, the control part 150 discussed above with reference to FIG. 2 may be implemented using the wireless communication interface 963. Also, at least part of the above-described functions may be implemented using the controller 951. For example, when the RTS frame is transmitted by the wireless access point 950 using the transmitting power determined on the basis of the surrounding environment information, the efficiency of utilization of the communication resources is improved.

The embodiments described above are merely examples in which the present technology may be implemented. The particulars of the embodiments correspond substantially to the inventive matters claimed in the appended claims. Likewise, the inventive matters named in the appended claims correspond substantially to the particulars of the embodiments with the same names in the foregoing description of the preferred embodiments of the present technology. However, these embodiments and other examples are not limitative of the present technology that may also be implemented using various modifications and alterations of the embodiments so far as they are within the scope of the appended claims.

Furthermore, the procedures discussed above in connection with the embodiments may be construed as constituting a method having a series of such procedures. The procedures may alternatively be construed as forming a program for causing a computer to execute a series of such procedures, or as constituting a recording medium storing such a program. The recording medium may be a CD (Compact Disc), an MD (MiniDisc), a DVD (Digital Versatile Disc), a memory card, or a Blu-ray Disc (registered trademark), for example.

The advantageous effects mentioned in this description are only examples and not limitative of the present disclosure. There may be other advantageous effects derived from and not covered by this description.

The present technology may be configured preferably as follows:

(1)

An information processing apparatus including a control part configured to perform control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of surrounding environment information regarding an environment surrounding the information processing apparatus transmitting the frame.

(2)

The information processing apparatus as stated in paragraph (1) above, in which the control part performs control to transmit a communication end frame for notifying the end of communication of the data and for requesting the transmission inhibition time to be canceled, the communication end frame being transmitted with the transmitting power determined on the basis of the surrounding environment information.

(3)

The information processing apparatus as stated in paragraph (2) above, in which the control part performs control to transmit the communication end frame using the transmitting power determined on the basis of transmitting power information transmitted from the information processing apparatus as the destination and of the surrounding environment information.

(4)

An information processing apparatus including a control part configured to perform control to transmit a frame for enabling an information processing apparatus as a source of data to transmit the data and for requesting information processing apparatuses other than the information processing apparatus as the source to set a transmission inhibition time, the frame being transmitted with transmitting power determined on the basis of surrounding environment information regarding an environment surrounding the information processing apparatus transmitting the frame.

(5)

The information processing apparatus as stated in paragraph (4) above, in which the control part performs control to transmit the frame in which information regarding the transmitting power is stored.

(6)

The information processing apparatus as stated in paragraph (4) or (5) above, in which the control part performs control to transmit a communication end frame for notifying the end of communication of the data and for requesting the transmission inhibition time to be canceled, the communication end frame being transmitted with the transmitting power determined on the basis of the surrounding environment information.

(7)

An information processing apparatus including a control part configured to perform control to transmit a frame for enabling the own information processing apparatus to transmit data and for requesting other information processing apparatuses to set a transmission inhibition time, the frame being transmitted with transmitting power determined on the basis of surrounding environment information regarding an environment surrounding the own information processing apparatus.

(8)

The information processing apparatus as stated in paragraph (7) above, in which the control part performs control to transmit a communication end frame for notifying the end of communication of the data and for requesting the transmission inhibition time to be canceled, the communication end frame being transmitted with the transmitting power determined on the basis of the surrounding environment information.

(9)

The information processing apparatus as stated in paragraph (7) or (8) above, in which the control part, in the case of transmitting data, performs control to transmit the frame using the transmitting power determined on the basis of the surrounding environment information and of destination surrounding environment information regarding an environment surrounding the information processing apparatus as the destination of the data.

(10)

The information processing apparatus as stated in paragraph (9) above, in which the control part performs control to transmit a communication end frame for notifying the end of communication of the data and for requesting the transmission inhibition time to be canceled, the communication end frame being transmitted with the transmitting power determined on the basis of the destination surrounding environment information and the surrounding environment information.

(11)

A communication system including a first information processing apparatus including a first control part configured to perform control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of first surrounding environment information regarding an environment surrounding the first information processing apparatus; and a second information processing apparatus including a second control part configured to perform control to transmit a frame for enabling the information processing apparatus as a source of the data to transmit the data and for requesting information processing apparatuses other than the information processing apparatus as the source to set a transmission inhibition time, the frame being transmitted with transmitting power determined on the basis of second surrounding environment information regarding an environment surrounding the second information processing apparatus.

(12)

An information processing method including a control procedure for performing control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of surrounding environment information regarding an environment surrounding the information processing apparatus transmitting the frame.

(13)

An information processing method including a control procedure for performing control to transmit a frame for enabling an information processing apparatus as a source of data to transmit the data and for requesting information processing apparatuses other than the information processing apparatus as the source to set a transmission inhibition time, the frame being transmitted with transmitting power determined on the basis of surrounding environment information regarding an environment surrounding the information processing apparatus transmitting the frame.

(14)

An information processing method including a control procedure for performing control to transmit a frame for enabling an own information processing apparatus to transmit data and for requesting other information processing apparatuses to set a transmission inhibition time, the frame being transmitted with transmitting power determined on the basis of surrounding environment information regarding an environment surrounding the own information processing apparatus.

(15)

A program for causing a computer to execute a control procedure for performing control to transmit a frame for requesting the transmission of data to an information processing apparatus as a destination of the data and for requesting information processing apparatuses other than the information processing apparatus as the destination to set a transmission inhibition time, the frame being transmitted with transmitting power determined on the basis of surrounding environment information regarding an environment surrounding the information processing apparatus transmitting the frame.

(16)

A program for causing a computer to execute a control procedure for performing control to transmit a frame for enabling an information processing apparatus as a source of data to transmit the data and for requesting information processing apparatuses other than the information processing apparatus as the source to set a transmission inhibition time, the frame being transmitted with transmitting power determined on the basis of surrounding environment information regarding an environment surrounding the information processing apparatus transmitting the frame.

(17)

A program for causing a computer to execute a control procedure for performing control to transmit a frame for enabling an own information processing apparatus to transmit data and for requesting other information processing apparatuses to set a transmission inhibition time, the frame being transmitted with transmitting power determined on the basis of surrounding environment information regarding an environment surrounding the own information processing apparatus.

REFERENCE SIGNS LIS

10 Communication system
100 Information processing apparatus
110 Data processing part
120 Communication part
121 Modem part
122 Signal processing part
123 Wireless interface part
124 Wireless interface part
125, 126 Amplifier part
127, 128 Antenna 129 Channel estimating part
140 Power supply part
150 Control part
210, 220, 230, 240, 250, 260 Information processing apparatus
900 Smartphone
901 Processor
902 Memory
903 Storage
904 External connection interface
906 Camera
907 Sensors
908 Microphone
909 Input device
910 Display device
911 Speakers
913 Wireless communication interface
914 Antenna switch
915 Antenna
917 Bus
918 Battery
919 Auxiliary controller
920 Car navigation system
921 Processor
922 Memory
924 GPS module
925 Sensors
926 Data interface
927 Content player
928 Storage medium interface
929 Input device
930 Display device
931 Speakers
933 Wireless communication interface
934 Antenna switch
935 Antenna
938 Battery
941 Onboard network
942 Vehicle-side module
950 Wireless access point
951 Controller
952 Memory
954 Input device
955 Display device
957 Network interface
958 Wired communication network
963 Wireless communication interface
964 Antenna switch
965 Antenna

The invention claimed is:

1. An information processing apparatus comprising circuitry configured to:
receive a signal from a first information processing apparatus including information regarding a receiving power value and a transmitting power of the signal;
acquire surrounding environment information regarding an environment surrounding the information processing apparatus based on the information in the received signal regarding the receiving power value and the transmitting power of the signal; and
transmit a frame to the first information processing apparatus with transmitting power determined on a basis of the acquired surrounding environment information including the information in the received signal regarding the receiving power value and the transmitting power of the signal.

2. The information processing apparatus according to claim 1, wherein the circuitry is further configured to transmit a communication end frame for notifying the end of communication of the data, the communication end frame being transmitted with the transmitting power determined on a basis of the surrounding environment information.

3. The information processing apparatus according to claim 2, wherein the circuitry is further configured to transmit the communication end frame using the transmitting power determined on a basis of transmitting power information transmitted from the first information processing apparatus and of the surrounding environment information.

4. The information processing apparatus according to claim 1, wherein the circuitry is further configured to transmit the frame in which information regarding the transmitting power is stored.

5. The information processing apparatus according to claim 1, wherein the transmitting power determined on a basis of the surrounding environment information includes information regarding positions and distances to other information processing apparatuses.

6. An information processing apparatus comprising circuitry configured to:
transmit a signal to a first information processing apparatus and a second information processing apparatus including information regarding a receiving power value and a transmitting power of the signal;
receive a frame from the first information processing apparatus and the second information processing apparatus, each frame being transmitted with transmitting power determined on a basis of surrounding environment information including the information in the transmitted signal regarding the receiving power value and the transmitting power of the signal.

7. The information processing apparatus according to claim 6, wherein the circuitry is further configured to receive a communication end frame for notifying the end of communication of the data, the communication end frame being received with the transmitting power determined on a basis of the surrounding environment information.

8. The information processing apparatus according to claim 6, wherein the circuitry is further configured to receive the frame with the transmitting power determined on a basis of the surrounding environment information and of destination surrounding environment information regarding an environment surrounding the information processing apparatus as the destination of the data.

9. The information processing apparatus according to claim 8, wherein the circuitry is further configured to receive a communication end frame for notifying the end of communication of the data, the communication end frame being received with the transmitting power determined on a basis of the destination surrounding environment information and the surrounding environment information.

10. The information processing apparatus according to claim 6, wherein the transmitting power determined on a basis of the surrounding environment information includes information regarding positions and distances to other information processing apparatuses.

* * * * *